(12) United States Patent
Bi et al.

(10) Patent No.: US 12,328,699 B2
(45) Date of Patent: Jun. 10, 2025

(54) TIMING DIFFERENCE DETERMINATION METHOD AND APPARATUS, DEVICE, AND STORAGE MEDIUM

(71) Applicant: ZTE CORPORATION, Shenzhen (CN)

(72) Inventors: Feng Bi, Shenzhen (CN); Ting Miao, Shenzhen (CN); Weimin Xing, Shenzhen (CN); Youxiong Lu, Shenzhen (CN); Wenhao Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 288 days.

(21) Appl. No.: 17/916,701

(22) PCT Filed: Dec. 8, 2020

(86) PCT No.: PCT/CN2020/134403
§ 371 (c)(1),
(2) Date: Oct. 3, 2022

(87) PCT Pub. No.: WO2021/196702
PCT Pub. Date: Oct. 7, 2021

(65) Prior Publication Data
US 2023/0156644 A1 May 18, 2023

(30) Foreign Application Priority Data
Apr. 2, 2020 (CN) .......................... 202010256349.7

(51) Int. Cl.
*H04W 56/00* (2009.01)
*H04W 84/02* (2009.01)
(Continued)

(52) U.S. Cl.
CPC ....... *H04W 56/004* (2013.01); *H04W 56/001* (2013.01); *H04W 56/0015* (2013.01);
(Continued)

(58) Field of Classification Search
CPC .... H04L 27/26–26025; H04W 56/0005–0095; H04W 72/02–569;
(Continued)

(56) References Cited

U.S. PATENT DOCUMENTS

| 2015/0230268 A1 | 8/2015 | Chen et al. |
| 2018/0279334 A1 | 9/2018 | Lim et al. |

(Continued)

FOREIGN PATENT DOCUMENTS

| CN | 103891166 A | * | 6/2014 | ........ H04W 72/0413 |
| CN | 107889261 A | | 4/2018 | |

(Continued)

OTHER PUBLICATIONS

Indian Office Action for Application No. 202227061971, dated Mar. 14, 2023, 6 pages.
(Continued)

*Primary Examiner* — Timothy J Weidner
(74) *Attorney, Agent, or Firm* — Morgan, Lewis & Bockius LLP

(57) ABSTRACT

Provided are a timing difference determination method and apparatus, a device, and a storage medium. The timing difference determination method includes: determining a timing parameter based on at least one of the following parameters: a parameter related to the timing parameter, a parameter related to a timing advance, or a parameter related to a physical resource.

15 Claims, 2 Drawing Sheets

Determine a timing difference based on at least one of the following parameters: a parameter related to the timing parameter, a parameter related to a timing advance, or a parameter related to a physical resource — S110

(51) Int. Cl.
*H04W 88/02* (2009.01)
*H04W 88/08* (2009.01)
*H04W 88/10* (2009.01)
*H04W 92/02* (2009.01)
*H04W 92/10* (2009.01)
*H04W 92/20* (2009.01)

(52) U.S. Cl.
CPC ... *H04W 56/0025* (2013.01); *H04W 56/0045* (2013.01); *H04W 56/005* (2013.01); *H04W 84/02* (2013.01); *H04W 88/02* (2013.01); *H04W 88/08* (2013.01); *H04W 88/10* (2013.01); *H04W 92/02* (2013.01); *H04W 92/10* (2013.01); *H04W 92/20* (2013.01)

(58) Field of Classification Search
CPC ........... H04W 84/005–22; H04W 88/005–188; H04W 92/02–24
See application file for complete search history.

(56) References Cited

U.S. PATENT DOCUMENTS

| | | | |
|---|---|---|---|
| 2019/0159147 A1 | 5/2019 | Ryu et al. | |
| 2019/0223224 A1 | 7/2019 | Park et al. | |
| 2019/0313407 A1 | 10/2019 | Tsai | |
| 2020/0322976 A1* | 10/2020 | Islam | H04W 56/0045 |
| 2022/0272699 A1* | 8/2022 | Zhuo | H04W 56/0045 |

FOREIGN PATENT DOCUMENTS

| | | |
|---|---|---|
| CN | 109792700 A | 5/2019 |
| CN | 109831809 A | 5/2019 |
| CN | 110536406 A | 12/2019 |
| CN | 111901863 A | 11/2020 |
| JP | 2014532355 A | 12/2014 |
| WO | WO-2017156224 A1 | 9/2017 |
| WO | WO-2019/029646 A1 | 2/2019 |
| WO | WO-2019/208994 A1 | 10/2019 |
| WO | WO-2020/014080 A1 | 1/2020 |
| WO | WO 2021/234581 A1 | 11/2021 |

OTHER PUBLICATIONS

Extended European Search Report for Application No. 20928351.4, dated Mar. 25, 2024, 13 pages.
Samsung, "Corrections on integrated access and backhaul", 3GPP TSG-RAN WG1, Meeting #100bis-e, R1-2003175, Apr. 20, 2020, 5 pages.
Moderator (Zte), "FL summary #1 on IAB case-1 timing", 3GPP TSG RAN WG1 Meeting #101e, e-Meetng, RI-2004666, May 25, 2020, 14 pages.
Zte et al., "Discussion on remaining issues on Timing Delta MAC CE", 3GPP TSG-RAN WG2#109 electronic, R2-2000506, Feb. 24, 2020, 4 pages.
Huawei et al, "Remaining issue for the Timing Delta MAC CE", 3GPP TSG-RAN WG2 Meeting #109 electronic, R2-2000527, Feb. 24, 2020, 3 pages.
QUALCOMM Incorporated, "Correction to timing advance for BL/CE UEs", 3GPP TSG RAN WG1 Meeting #91, R1-1720834, Nov. 27-Dec. 1, 2017, Reno, USA, 2 pages.
International Search Report in Application No. PCT/CN2020/134403, dated Mar. 10, 2021, 4 pages including English translation.
Australian Office Action for Application No. 2020439938, dated Jul. 14, 2023, 5 pages.
Japanese Office Action for Application No. 2022-560163, dated Oct. 3, 2023, 8 pages.
Zte, Sanechips, "FL summary on remaining issues in IAB case-1 timing", 3GPP TSG RAN WG1 Meeting #100-e, R1-2000806, Retrieved from the Internet:URL: https://www.3gpp.org/ftp/tsg_ran/WG1_RL1/TSGR1_100_e/Docs/R1/2000806.zip, retrieved on Mar. 6, 2020.
First Search Report in Chinese Application No. 2020102563497 dated Sep. 18, 2024, 8 pages, including translation.
First Office Action in Chinese Application No. 202010256349.7 dated Sep. 25, 2024, 9 pages, including translation.

* cited by examiner

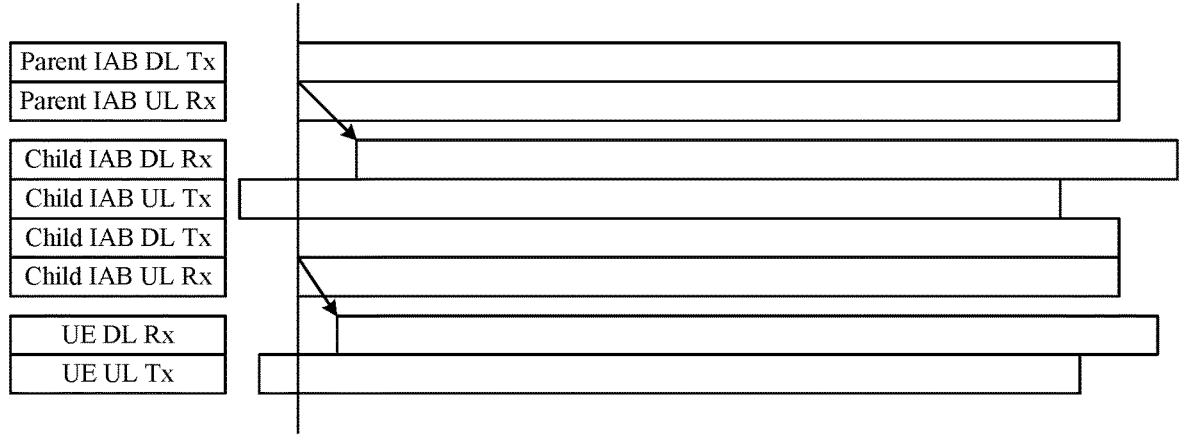
FIG. 1A
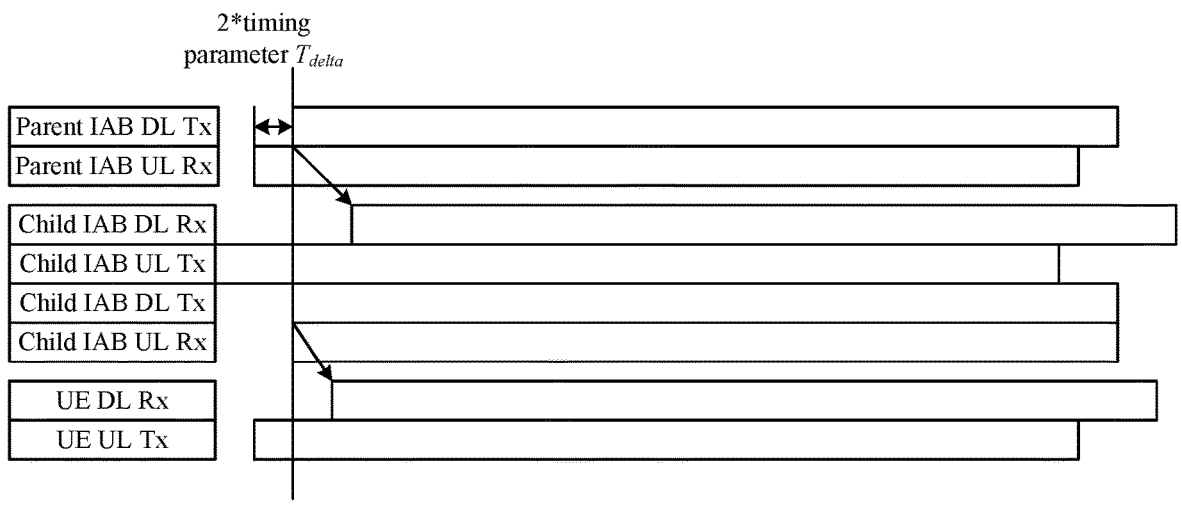
FIG. 1B
Determine a timing difference based on at least one of the following parameters: a parameter related to the timing parameter, a parameter related to a timing advance, or a parameter related to a physical resource — S110
FIG. 1C

TIMING DIFFERENCE DETERMINATION METHOD AND APPARATUS, DEVICE, AND STORAGE MEDIUM

CROSS-REFERENCE TO RELATED APPLICATION(S)

This is a national stage application filed under 37 U.S.C. 371 based on International Patent Application No. PCT/CN2020/134403, filed Dec. 8, 2020, which claims priority to Chinese Patent Application No. 202010256349.7 filed Apr. 2, 2020, the disclosures of which are incorporated herein by reference in their entireties.

TECHNICAL FIELD

The present disclosure relates to the field of wireless communication networks, for example, a timing difference determination method and apparatus, a device, and a storage medium.

BACKGROUND

With the continuous advancement of radio technology, various radio services are flourishing. However, frequency spectrum resources on which the radio services are relied are limited. In the face of the increasing demand for bandwidth, the spectrum resources from 300 MHz to 3 GHz, which are primarily adopted by the conventional commercial communications, are in extreme shortage and cannot satisfy the requirements of future wireless communications.

In a new generation of wireless communication systems, such as a new radio (NR) system, or a 5th generation mobile communication (5G) system, or a new generation communication system after 5G, a carrier frequency such as 28 GHz, 45 GHz or 70 GHz higher than the carrier frequency used by the 4th generation mobile communication (4G) system is used for communications. Such a high-frequency channel has the defects of the larger free-propagation loss, being easily absorbed by oxygen and greatly affected by rain fade, thus seriously affecting the coverage performance of the high-frequency communication system.

Since the carrier frequency corresponding to such high-frequency communication has a shorter wavelength, it can be ensured that more antenna elements are accommodated per unit area. The accommodation of more antenna elements means that the beamforming method can be used to increase antenna gains, thus ensuring the coverage performance of high-frequency communications. As the dense cell increasingly becomes an important application scenario, the dense cell requires more network deployment cost. However, the introduction of wireless backhaul transmission can make the network deployment to be easily performed and greatly reduce the network deployment cost. In addition, since the NR system includes the high-frequency band, the physical characteristics of the high-frequency carrier determine that the coverage range of the NR system becomes a huge challenge, the wireless backhaul transmission can also solve this problem.

SUMMARY

The embodiments of the present disclosure provide a timing difference determination method. The method includes the step described below.

A timing difference is determined based on at least one of the following parameters: a parameter related to the timing parameter, a parameter related to a timing advance, or a parameter related to a physical resource.

The embodiments of the present disclosure further provide a timing difference determination apparatus. The apparatus includes a determination module.

The determination module is configured to determine a timing difference based on at least one of the following parameters: a parameter related to the timing parameter, a parameter related to a timing advance, or a parameter related to a physical resource.

The embodiments of the present disclosure further provide a device. The device includes one or more processors and a memory.

The memory is configured to store one or more programs. The one or more programs, when executed by the one or more processors, cause the one or more processors to implement the timing difference determination method of any embodiment of the present disclosure.

The embodiments of the present disclosure further provide a storage medium. The storage medium is configured to store a computer program which, when executed by a processor, implements the timing difference determination method of any one of the embodiments of the present disclosure.

BRIEF DESCRIPTION OF DRAWINGS

FIG. 1A is a schematic diagram of alignment of an uplink receive and a downlink transmit on a parent node;

FIG. 1B is a schematic diagram of non-alignment of an uplink receive and a downlink transmit on a parent node;

FIG. 1C is a flowchart of a timing difference determination method according to an embodiment of the present disclosure;

DETAILED DESCRIPTION

Figure 2:
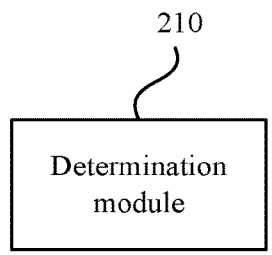
FIG. 2 is a structural diagram of a timing difference determination apparatus according to an embodiment of the present disclosure.

The embodiments of the present disclosure will be described below in detail in conjunction with the drawings.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from the sequences described herein.

For the NR system, projects have been initiated for integrated access and backhaul (JAB). For convenience of description, several labels are defined herein, that is, ($L_{P,DL}$, $L_{P,UL}$), ($L_{C,DL}$, $L_{C,UL}$), and ($L_{A,DL}$, $L_{A,UL}$). ($L_{P,DL}$, $L_{P,UL}$) represents the downlink and uplink between a node and a parent node, the preceding downlink and uplink may be considered as a backhaul link (BT), and the preceding node may be considered as a child node of the parent node. ($L_{C,DL}$, $L_{C,UL}$) represents the downlink and uplink between a node and a child node, the preceding downlink and uplink may be considered as a BT, and the preceding node may be considered as a parent node of the child node. ($L_{A,DL}$, $L_{A,UL}$) represents the downlink and uplink between a node and a user equipment, the preceding downlink and uplink together may be considered as an access link (AL). The parent node may also be a donor node (DN) (including a donor gNB).

Meanwhile, in order to overcome the problem of transmit-receive self-interference caused by a half-duplex relay node in an in-band scenario, the following multiplexing modes between the BL and the AL are proposed: time division multiplexing (TDM), frequency division multiplexing (FDM), spatial division multiplexing (SDM), where the TDM indicates that different time resources are used between the BL and the AL, the SDM indicates that different beam resources are used between the BL and the AL, and the FDM indicates that different frequency resources are used between the BL and the AL. Two functions are further defined for a relay node (RN, also known as an IAB Node), namely an IAB node mobile terminal (MT) and an IAB node distributed unit (DU).

To keep the network synchronization and thus reduce the mutual interference among nodes, downlink transmit timing (DL Tx timing, DTT) is required to be aligned among nodes. In principle, as long as the child node advances TA/2 based on downlink receive timing (DL Rx timing, DRT) of the child node, where TA may refer to a timing advance, that is, as long as the DTT of the child node is equal to (DRT−TA/2), the DTT alignment among nodes can be implemented. However, due to the implementation at the parent node side and the like, there is an offset between uplink receive timing (UL Rx timing, URT) of the parent node and the DTT of the parent node, so the child node cannot simply consider the DTT of the child node equal to (DRT−TA/2) as the actual DTT of the child node. It is reasonable that the child node calculates $(TA/2+T_{delta})$ to obtain the time difference between the DTT of the parent node and the DRT of the child node. Therefore, the reasonable DTT of the child node is equal to $DRT-(TA/2+T_{delta})$. For the alignment of the uplink receive and the downlink transmit on the parent node, reference may be made to FIG. 1A, and for the non-alignment of uplink receive and downlink transmit on the parent node, reference may be made to FIG. 1B.

In an exemplary implementation manner, FIG. 1C is a flowchart of a timing difference determination method according to an embodiment of the present disclosure. The method may be performed by a timing difference determination apparatus which may be implemented by software and/or hardware, and the apparatus may be integrated on a node device.

As shown in FIG. 1C, the method provided by the present disclosure includes step S110 described below.

In S110, a timing difference is determined based on at least one of the following parameters: a parameter related to the timing parameter, a parameter related to a timing advance, or a parameter related to a physical resource.

In an exemplary implementation manner, the parameter related to the timing parameter includes at least one of: a timing parameter index, a timing parameter index offset, a timing parameter range, a timing parameter granularity, or a baseline offset.

In an exemplary implementation manner, the parameter related to the timing advance includes at least one of: a timing advance, a timing advance granularity, or a timing advance offset.

In an exemplary implementation manner, the parameter related to the physical resource includes a frequency range or a sub-carrier spacing.

In an exemplary implementation manner, the manner of determining the timing difference includes a step described below.

The timing parameter is obtained based on the calculation of the parameter.

In an exemplary implementation manner, the manner of determining the timing difference includes a step described below. The timing parameter is obtained in a table look-up manner based on the parameter.

In an exemplary implementation manner, the manner of determining the timing difference includes steps described below.

The parameter related to the timing parameter and/or the parameter related to the timing advance is determined based on the frequency range, and the timing difference is determined based on the determined parameter related to the timing parameter and/or the determined parameter related to the timing advance.

The frequency range determines the timing parameter by determining at least one of the following parameters: the timing parameter index, the timing parameter index offset, the timing parameter range, the timing parameter granularity, the timing advance, the timing advance granularity, the timing advance offset, or the baseline offset.

In an exemplary implementation manner, the manner of determining the timing difference includes steps described below.

The parameter related to the timing parameter and/or the parameter related to the timing advance is determined based on the sub-carrier spacing, and the timing difference is determined based on the determined parameter related to the timing parameter and/or the determined parameter related to the timing advance.

The sub-carrier spacing determines the timing difference by determining at least one of the following parameters: the timing parameter index, the timing parameter index offset, the timing parameter range, the timing parameter granularity, the timing advance, the timing advance granularity, the timing advance offset, or the baseline offset.

In an exemplary implementation manner, the sub-carrier spacing is determined in a configured manner or a default manner.

In an exemplary implementation manner, the sub-carrier spacing is determined based on at least one of the following manners: configuring a sub-carrier spacing; configuring a bandwidth part identifier, and determining a sub-carrier spacing of a bandwidth part corresponding to the bandwidth part identifier; or configuring a carrier identifier, and determining a sub-carrier spacing of a carrier corresponding to the carrier identifier.

The sub-carrier spacing is determined based on at least one of the following manners: configuring a sub-carrier spacing; configuring one of a downlink bandwidth part identifier or an uplink bandwidth part identifier, and determining a sub-carrier spacing of a bandwidth part corresponding to the one of the downlink bandwidth part identifier or the uplink bandwidth part identifier; or configuring one of a downlink carrier identifier or an uplink carrier identifier, and determining a sub-carrier spacing of a carrier corresponding to the one of the downlink carrier identifier or the uplink carrier identifier.

In an exemplary implementation manner, the sub-carrier spacing is determined based on at least one of the following manners: determining a sub-carrier spacing corresponding to the timing advance granularity; determining a sub-carrier spacing of a bandwidth part in which signaling corresponding to the timing parameter index is located; determining a minimum sub-carrier spacing or a maximum sub-carrier spacing among sub-carrier spacings of bandwidth parts; or determining by a reference sub-carrier spacing of a bandwidth part.

The sub-carrier spacing may be determined based on at least one of the following manners: determining a sub-carrier spacing corresponding to the timing advance granularity; determining a sub-carrier spacing corresponding to a timing advance granularity corresponding to a timing advance command; determining a sub-carrier spacing of a downlink bandwidth part in which signaling corresponding to the timing parameter index is located; determining a sub-carrier spacing of a downlink carrier in which signaling corresponding to the timing parameter index is located, where the signaling corresponding to the timing parameter index is signaling carrying the timing parameter index; determining the minimum or maximum sub-carrier spacing among sub-carrier spacings of one or more configured downlink bandwidth parts; determining the minimum or maximum sub-carrier spacing among sub-carrier spacings of one or more activated downlink bandwidth parts; determining the minimum or maximum sub-carrier spacing among sub-carrier spacings of one or more configured downlink carriers; determining the minimum or maximum sub-carrier spacing among sub-carrier spacings of one or more activated downlink carriers; determining a sub-carrier spacing of a downlink bandwidth part corresponding to the minimum or maximum identifier among one or more configured downlink bandwidth part identifiers; determining a sub-carrier spacing of a downlink bandwidth part corresponding to the minimum or maximum identifier among one or more activated downlink bandwidth part identifiers; determining a sub-carrier spacing of a downlink carrier corresponding to the minimum or maximum identifier among one or more configured downlink carrier identifiers; determining a sub-carrier spacing of a downlink carrier corresponding to the minimum or maximum identifier among one or more activated downlink carrier identifiers; determining by a reference sub-carrier spacing of a downlink bandwidth part by default; determining by a reference sub-carrier spacing of a downlink carrier by default; determining the minimum or maximum sub-carrier spacing among sub-carrier spacings of one or more configured uplink bandwidth parts; determining the minimum or maximum sub-carrier spacing among sub-carrier spacings of one or more activated uplink bandwidth parts; determining the minimum or maximum sub-carrier spacing among sub-carrier spacings of one or more configured uplink carriers; determining the minimum or maximum sub-carrier spacing among sub-carrier spacings of one or more activated uplink carriers; determining a sub-carrier spacing of an uplink bandwidth part corresponding to the minimum or maximum identifier among one or more configured uplink bandwidth part identifiers; determining a sub-carrier spacing of an uplink bandwidth part corresponding to the minimum or maximum identifier among one or more activated uplink bandwidth part identifiers; determining a sub-carrier spacing of an uplink carrier corresponding to the minimum or maximum identifier among one or more configured uplink carrier identifiers; determining a sub-carrier spacing of an uplink carrier corresponding to the minimum or maximum identifier among one or more activated uplink carrier identifiers; determining by a reference sub-carrier spacing of a uplink bandwidth part by default; determining by a reference sub-carrier spacing of a uplink carrier by default; or determining by a reference sub-carrier spacing corresponding to a resource of a distributed unit semi-statically configured by a centralized unit.

In an exemplary implementation manner, the frequency range is determined based on at least one of the following manners: determining by a reference frequency range in which a downlink bandwidth part is located by default; determining by a reference frequency range in which a downlink carrier is located by default; determining by a reference frequency range in which an uplink bandwidth part is located by default; or determining by a reference frequency range in which an uplink carrier is located by default.

In an exemplary implementation manner, if determined sub-carrier spacings correspond to different frequency ranges, the frequency range is determined as a first frequency range or a second frequency range.

In an exemplary implementation manner, a sub-carrier spacing corresponding to the timing advance granularity is the maximum sub-carrier spacing among sub-carrier spacings of one or more activated uplink bandwidth parts.

In an exemplary implementation manner, the sub-carrier spacing corresponding to the timing advance granularity is a predefined or configured sub-carrier spacing.

In an exemplary implementation manner, in response to a sub-carrier spacing of an uplink bandwidth part corresponding to one of a non-supplementary uplink or a supplementary uplink being less than the sub-carrier spacing corresponding to the timing advance granularity, a timing advance granularity corresponding to the sub-carrier spacing of the uplink bandwidth part corresponding to the one of the non-supplementary uplink or the supplementary uplink is kept unchanged.

In response to the sub-carrier spacing of the uplink bandwidth part corresponding to one of the non-supplementary uplink or the supplementary uplink being less than the sub-carrier spacing corresponding to the timing advance granularity, the integer multiple operation is not performed on the timing advance granularity corresponding to the sub-carrier spacing of the uplink bandwidth part corresponding to the one of the non-supplementary uplink or the supplementary uplink.

In an exemplary implementation manner, in response to a sub-carrier spacing of the uplink bandwidth part being less than the sub-carrier spacing corresponding to the timing advance granularity, the timing advance granularity corresponding to the sub-carrier spacing of the uplink bandwidth part is kept unchanged.

In response to the sub-carrier spacing of the uplink bandwidth part being less than the sub-carrier spacing corresponding to the timing advance granularity, the integer multiple operation is not performed on the timing advance granularity corresponding to the sub-carrier spacing of the uplink bandwidth part.

In an exemplary implementation manner, in response to the sub-carrier spacing of the uplink bandwidth part being less than the sub-carrier spacing corresponding to the timing advance granularity, the integer multiple operation is performed on the timing advance granularity corresponding to the sub-carrier spacing of the uplink bandwidth part.

In an exemplary implementation manner, in response to the sub-carrier spacing of the uplink bandwidth part being less than the sub-carrier spacing corresponding to the timing advance granularity, whether to perform the integer multiple operation on the timing advance granularity corresponding to the sub-carrier spacing of the uplink bandwidth part is determined based on a pre-defined manner or a configured manner.

In an exemplary implementation manner, in response to the sub-carrier spacing of the uplink bandwidth part being less than the sub-carrier spacing corresponding to the timing advance granularity, whether to perform the integer multiple operation on the timing advance granularity corresponding to the sub-carrier spacing of the uplink bandwidth part is determined based on a feedback manner.

In an exemplary implementation manner, in response to a non-supplementary uplink and a supplementary uplink existing, the timing difference is determined in at least one of the following manners:

configuring the timing difference based on a measurement of the uplink receive of the non-supplemental uplink; configuring the timing difference based on a measurement of the uplink receive of the supplemental uplink; determining by default that the timing difference is measured based on an uplink receive of the non-supplementary uplink; determining by default that the timing difference is measured based on an uplink receive of the supplementary uplink; or determining by default that the timing difference is measured based on an uplink receive at latest or last moment, where the uplink receive at the latest or last moment is determined based on an uplink receive at the latest or last moment in the non-supplementary uplink and the supplementary uplink.

In the embodiment, various symbols are defined, and for the definition of each symbol, reference may be made as follows:

$T_c$ represents a time unit, and $T_c = 1/(\Delta f_{max} \cdot N_f)$, where $\Delta f_{max} = 480 \cdot 10^3$ Hz, and $N_f = 4096$; $N_{TA}$ represents the timing advance and refers to a time advance of an uplink transmit at the node side with respect to a downlink receive at the node side; $N_{TA,offset}$ represents the timing advance offset, including $0 \cdot T_c$, $13792 \cdot T_c$, $25600 \cdot T_c$, and $39936 \cdot T_c$. $T_{delta}$ represents the timing parameter. $T_D$ represents the timing parameter index. $T_{D,offset}$ represents an offset of the timing parameter index. L represents a lower bound of the range of the timing parameter index and L is an integer. U represents an upper bound of the range of the timing parameter index and U is an integer. m represents a lower bound offset of the range of the timing parameter index and m is an integer. n represents an upper bound offset of the range of the timing parameter index and n is an integer. $O_B$ represents a signaling overhead of the timing parameter. $N_{B,offset}$ represents the baseline offset. $N_G$ represents the timing parameter granularity. $\Delta f$ represents the sub-carrier spacing, $\mu$ represents an index of the sub-carrier spacing, and $\Delta f = 2^\mu \cdot 15$ kHz. FR1 represents a frequency range 1 which ranges from 410 MHz to 7125 MHz. FR2 represents a frequency range 2 which ranges from 24250 MHz to 52600 MHz.

In an exemplary implementation manner, the timing parameter $T_{delta}$ is determined based on the following formulas and parameters:

$$T_{delta} = f(-N_{TA,offset}/2 + N_{B,offset} + (T_D + T_{D,offset}) \cdot N_G) \cdot T_c,$$
or $$T_{delta} = f(N_{B,offset} + (T_D + T_{D,offset}) \cdot N_G) T_c, \text{ or } T_{delta} = f(-N_{TA,offset}/2 + (T_D T_{D,offset}) \cdot N_G) \cdot T_c, \text{ or}$$

$$T_{delta} = f((T_D + T_{D,offset}) \cdot N_G) T_c, \text{ or } T_{delta} = f(-N_{TA,offset}/2 + N_{B,offset} + T_D \cdot N_G) \cdot T_c, \text{ or}$$

$$T_{delta} = f(N_{B,offset} + T_D \cdot N_G) \cdot T_c, \text{ or } T_{delta} = f(-N_{TA,offset}/2 + T_D \cdot N_G) \cdot T_c, \text{ or}$$

$$T_{delta} = f(T_D \cdot N_G) \cdot T_c.$$

The above function f(x) has the following characteristics: functional form 1: f(x)=x; or functional form 2: $f(x) = \lfloor x/N_G \rfloor \cdot N_G$ where $\lfloor \ \rfloor$ represents round-down or functional form 3: $f(x) = \lceil x/N_G \rceil \cdot N_G$, where $\lceil \ \rceil$ represents round-up.

In an exemplary implementation manner, the frequency range (FR) is distinguished, and different FRs correspond to different baseline offsets.

For the FR1, for example, a total range of $T_D$ may be {0, 1, 2, ..., 1199}.

For $\mu=0$, that is, $\Delta f$ is 15 kHz, $N_{B,offset}$ is $-70528$, $T_{D,offset}$ is 0, and $N_G$ is $64T_c$, the range of $T_D$ may be {0, 1, 2, ..., 1199+n}, where n may be 0.

For $\mu=1$, that is, $\Delta f$ is 30 kHz, $N_{B,offset}$ is $-70528$, $T_{D,offset}$ is 550, and $N_G$ is $64T_c$, the range of $T_D$ may be {0, 1, 2, ..., 647+n}, where n may be 0.

For $\mu=2$, that is, $\Delta f$ is 60 kHz, $N_{B,offset}$ is $-70528$, $T_{D,offset}$ is 826, and $N_G$ is $64T_c$, the range of $T_D$ may be {0, 1, 2, ..., 370+n}, where n may be 0.

$$T_{delta} = \begin{cases} (-N_{TA,offset}/2 - 70528 + T_D \cdot 64) \cdot T_c & \mu = 0 \\ (-N_{TA,offset}/2 - 70528 + (T_D + 550) \cdot 64) \cdot T_c & \mu = 1, \text{ or} \\ (-N_{TA,offset}/2 - 70528 + (T_D + 826) \cdot 64) \cdot T_c & \mu = 2 \end{cases}$$

$$T_{delta} = \begin{cases} \lfloor (-N_{TA,offset}/2 - 70528 + T_D \cdot 64)/64 \rfloor \cdot 64 T_c & \mu = 0 \\ \lfloor (-N_{TA,offset}/2 - 70528 + (T_D + 550) \cdot 64)/64 \rfloor \cdot 64 T_c & \mu = 1, \text{ or} \\ \lfloor (-N_{TA,offset}/2 - 70528 + (T_D + 826) \cdot 64)/64 \rfloor \cdot 64 T_c & \mu = 2 \end{cases}$$

$$T_{delta} = \begin{cases} \lceil (-N_{TA,offset}/2 - 70528 + T_D \cdot 64)/64 \rceil \cdot 64 T_c & \mu = 0 \\ \lceil (-N_{TA,offset}/2 - 70528 + (T_D + 550) \cdot 64)/64 \rceil \cdot 64 T_c & \mu = 1. \\ \lceil (-N_{TA,offset}/2 - 70528 + (T_D + 826) \cdot 64)/64 \rceil \cdot 64 T_c & \mu = 2 \end{cases}$$

For the FR2, for example, the total range of $T_D$ may be {0, 1, 2, ..., 1199}.

For $\mu=2$, that is, $\Delta f$ is 60 kHz, $N_{B,offset}$ is $-17664$, $T_{D,offset}$ is 0, and $N_G$ is $32T_c$, the range of $T_D$ may be {0, 1, 2, ..., 740+n}, where n may be 0.

For $\mu=3$, that is, $\Delta f$ is 120 kHz, $N_{B,offset}$ is $-17664$, $T_{D,offset}$ is 277, and $N_G$ is $32T_c$, the range of $T_D$ may be {0, 1, 2, ..., 463+n}, where n may be 0.

$$T_{delta} = \begin{cases} (-N_{TA,offset}/2 - 17664 + T_D \cdot 32) \cdot T_c & \mu = 2 \\ (-N_{TA,offset}/2 - 17664 + (T_D + 277) \cdot 32) \cdot T_c & \mu = 3 \end{cases}, \text{ or}$$

$$T_{delta} = \begin{cases} \lfloor (-N_{TA,offset}/2 - 17664 + T_D \cdot 32)/32 \rfloor \cdot 32 T_c & \mu = 2 \\ \lfloor (-N_{TA,offset}/2 - 17664 + (T_D + 277) \cdot 32)/32 \rfloor \cdot 32 T_c & \mu = 3 \end{cases}, \text{ or}$$

$$T_{delta} = \begin{cases} \lceil (-N_{TA,offset}/2 - 17664 + T_D \cdot 32)/32 \rceil \cdot 32 T_c & \mu = 2 \\ \lceil (-N_{TA,offset}/2 - 17664 + (T_D + 277) \cdot 32)/32 \rceil \cdot 32 T_c & \mu = 3 \end{cases}.$$

When the actual value of the timing parameter index corresponding to the configured $T_D$ exceeds the lower or upper bound of the range of $T_D$, $T_{delta}$ is calculated by using the lower or upper bound of the range of $T_D$ or $T_D$ is considered as an error configuration and thus is ignored.

In an exemplary implementation manner, the FR may be distinguished, and different FRs correspond to the same baseline offset.

For the FR1, for example, the total range of $T_D$ may be {0, 1, 2, ..., 1199}.

For $\mu=0$, that is, $\Delta f$ is 15 kHz, $N_{B,offset}$ is $-70528$, $T_{D,offset}$ is 0, and $N_G$ is $64T_c$, the range of $T_D$ may be {0, 1, 2, ..., 1199+n}, where n may be 0.

For $\mu=1$, that is, $\Delta f$ is 30 kHz, $N_{B,offset}$ is $-70528$, $T_{D,offset}$ is 550, and $N_G$ is $64T_c$, the range of $T_D$ may be {0, 1, 2, ..., 647+n}, where n may be 0.

For $\mu=$, that is, $\Delta f$ is 60 kHz, $N_{B,offset}$ is $-70528$, $T_{D,offset}$ is 826, and $N_G$ is $64T_c$, the range of $T_D$ may be {0, 1, 2, ..., 370+n}, where n may be 0.

$$T_{delta} = \begin{cases} (-N_{TA,offset}/2 - 70528 + T_D \cdot 64) \cdot T_c & \mu = 0 \\ (-N_{TA,offset}/2 - 70528 + (T_D + 550) \cdot 64) \cdot T_c & \mu = 1 \\ (-N_{TA,offset}/2 - 70528 + (T_D + 826) \cdot 64) \cdot T_c & \mu = 2 \end{cases}, \text{ or}$$

$$T_{delta} = \begin{cases} \lfloor(-N_{TA,offset}/2 - 70528 + T_D \cdot 64)/64\rfloor \cdot 64 T_c & \mu = 0 \\ \lfloor(-N_{TA,offset}/2 - 70528 + (T_D + 550) \cdot 64)/64\rfloor \cdot 64 T_c & \mu = 1 \\ \lfloor(-N_{TA,offset}/2 - 70528 + (T_D + 826) \cdot 64)/64\rfloor \cdot 64 T_c & \mu = 2 \end{cases}, \text{ or}$$

$$T_{delta} = \begin{cases} \lceil(-N_{TA,offset}/2 - 70528 + T_D \cdot 64)/64\rceil \cdot 64 T_c & \mu = 0 \\ \lceil(-N_{TA,offset}/2 - 70528 + (T_D + 550) \cdot 64)/64\rceil \cdot 64 T_c & \mu = 1 \\ \lceil(-N_{TA,offset}/2 - 70528 + (T_D + 826) \cdot 64)/64\rceil \cdot 64 T_c & \mu = 2 \end{cases}.$$

For the FR2, for example, the total range of $T_D$ may be $\{0, 1, 2, \ldots, 1199\}$.

For $\mu=2$, that is, $\Delta f$ is 60 kHz, $N_{B,offset}$ is $-70528$, $T_{D,offset}$ is 1652, and $N_G$ is $32T_c$, the range of $T_D$ may be $\{0, 1, 2, \ldots, 740+n\}$, where n may be 0.

For $\mu=3$, that is, $\Delta f$ is 120 kHz, $N_{B,offset}$ is $-70528$, $T_{D,offset}$ is 1929, and $N_G$ is $32T_c$, the range of $T_D$ may be $\{0, 1, 2, \ldots, 463+n\}$, where n may be 0.

$$T_{delta} = \begin{cases} (-N_{TA,offset}/2 - 70528 + (T_D + 1652) \cdot 32) \cdot T_c & \mu = 2 \\ (-N_{TA,offset}/2 - 70528 + (T_D + 1929) \cdot 32) \cdot T_c & \mu = 3 \end{cases}, \text{ or}$$

$$T_{delta} = \begin{cases} \lfloor(-N_{TA,offset}/2 - 70528 + (T_D + 1652) \cdot 32)/32\rfloor \cdot 32 T_c & \mu = 2 \\ \lfloor(-N_{TA,offset}/2 - 70528 + (T_D + 1929) \cdot 32)/32\rfloor \cdot 32 T_c & \mu = 3 \end{cases}, \text{ or}$$

$$T_{delta} = \begin{cases} \lceil(-N_{TA,offset}/2 - 70528 + (T_D + 1652) \cdot 32)/32\rceil \cdot 32 T_c & \mu = 2 \\ \lceil(-N_{TA,offset}/2 - 70528 + (T_D + 1929) \cdot 32)/32\rceil \cdot 32 T_c & \mu = 3 \end{cases}.$$

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

In an exemplary implementation manner, the FR may be distinguished, and different sub-carrier spacings correspond to different baseline offsets.

For the FR1, for example, the total range of $T_D$ may be $\{0, 1, 2, \ldots, 1199\}$.

For $\mu=0$, that is, $\Delta f$ is 15 kHz, $N_{B,offset}$ is $-70528$, $T_{D,offset}$ is 0, and $N_G$ is $64T_c$, the range of $T_D$ may be $\{0, 1, 2, \ldots, 1199+n\}$, where n may be 0.

For $\mu=1$, that is, $\Delta f$ is 30 kHz, $N_{B,offset}$ is $-35328$, $T_{D,offset}$ is 0, and $N_G$ is $64T_c$, the range of $T_D$ may be $\{0, 1, 2, \ldots, 647+n\}$, where n may be 0.

For $\mu=2$, that is, $\Delta f$ is 60 kHz, $N_{B,offset}$ is $-17664$, $T_{D,offset}$ is 0, and $N_G$ is $64T_c$, the range of $T_D$ may be $\{0, 1, 2, \ldots, 370+n\}$, where n may be 0.

$$T_{delta} = \begin{cases} (-N_{TA,offset}/2 - 70528 + T_D \cdot 64) \cdot T_c & \mu = 0 \\ (-N_{TA,offset}/2 - 35328 + T_D \cdot 64) \cdot T_c & \mu = 1 \\ (-N_{TA,offset}/2 - 17664 + T_D \cdot 64) \cdot T_c & \mu = 2 \end{cases}, \text{ or}$$

$$T_{delta} = \begin{cases} \lfloor(-N_{TA,offset}/2 - 70528 + T_D \cdot 64)/64\rfloor \cdot 64 T_c & \mu = 0 \\ \lfloor(-N_{TA,offset}/2 - 35328 + T_D \cdot 64)/64\rfloor \cdot 64 T_c & \mu = 1 \\ \lfloor(-N_{TA,offset}/2 - 17664 + T_D \cdot 64)/64\rfloor \cdot 64 T_c & \mu = 2 \end{cases}, \text{ or}$$

$$T_{delta} = \begin{cases} \lceil(-N_{TA,offset}/2 - 70528 + T_D \cdot 64)/64\rceil \cdot 64 T_c & \mu = 0 \\ \lceil(-N_{TA,offset}/2 - 35328 + T_D \cdot 64)/64\rceil \cdot 64 T_c & \mu = 1 \\ \lceil(-N_{TA,offset}/2 - 17664 + T_D \cdot 64)/64\rceil \cdot 64 T_c & \mu = 2 \end{cases}.$$

For the FR2, for example, the total range of $T_D$ may be $\{0, 1, 2, \ldots, 1199\}$.

For $\mu=2$, that is, $\Delta f$ is 60 kHz, $N_{B,offset}$ is $-17664$, $T_{D,offset}$ is 0, and $N_G$ is $32T_c$, the range of $T_D$ may be $\{0, 1, 2, \ldots, 740+n\}$, where n may be 0.

For $\mu=3$, that is, $\Delta f$ is 120 kHz, $N_{B,offset}$ is $-8816$, $T_{D,offset}$ is 0, and $N_G$ is $32T_c$, the range of $T_D$ may be $\{0, 1, 2, \ldots, 464+n\}$, where n may be 0.

$$T_{delta} = \begin{cases} (-N_{TA,offset}/2 - 17664 + T_D \cdot 32) \cdot T_c & \mu = 2 \\ (-N_{TA,offset}/2 - 8816 + T_D \cdot 32) \cdot T_c & \mu = 3 \end{cases}, \text{ or}$$

$$T_{delta} = \begin{cases} \lfloor(-N_{TA,offset}/2 - 17664 + T_D \cdot 32)/32\rfloor \cdot 32 T_c & \mu = 2 \\ \lfloor(-N_{TA,offset}/2 - 8816 + T_D \cdot 32)/32\rfloor \cdot 32 T_c & \mu = 3 \end{cases}, \text{ or}$$

$$T_{delta} = \begin{cases} \lceil(-N_{TA,offset}/2 - 17664 + T_D \cdot 32)/32\rceil \cdot 32 T_c & \mu = 2 \\ \lceil(-N_{TA,offset}/2 - 8816 + T_D \cdot 32)/32\rceil \cdot 32 T_c & \mu = 3 \end{cases}.$$

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

In an exemplary implementation manner, the FR may be distinguished, and the timing parameter is mapped from the upper bound to the lower bound. The principle of mapping the timing parameter from the upper bound to the lower bound is the same as the principle of mapping the timing parameter from the lower bound to the upper bound (which is described in the above embodiments), which will not be described in detail herein.

For the FR1, for example, the total range of $T_D$ may be $\{0, 1, 2, \ldots, 1199\}$.

For $\mu=0$, that is, $\Delta f$ is 15 kHz, $N_{B,offset}$ is 6256, $T_{D,offset}$ is 0, and $N_G$ is $64T_c$, the range of $T_D$ may be $\{0, 1, 2, \ldots, 1199+n\}$, where n may be 0.

For $\mu=1$, that is, $\Delta f$ is 30 kHz, $N_{B,offset}$ is 6128, $T_{D,offset}$ is 0, and $N_G$ is $64T_c$, the range of $T_D$ may be $\{0, 1, 2, \ldots, 647+n\}$, where n may be 0.

For $\mu=2$, that is, $\Delta f$ is 60 kHz, $N_{B,offset}$ is 6032, $T_{D,offset}$ is 0, and $N_G$ is $64T_c$, the range of $T_D$ may be $\{0, 1, 2, \ldots, 370+n\}$, where n may be 0.

$$T_{delta} = \begin{cases} (-N_{TA,offset}/2 + 6256 - T_D \cdot 64) \cdot T_c & \mu = 0 \\ (-N_{TA,offset}/2 + 6128 - T_D \cdot 64) \cdot T_c & \mu = 1 \\ (-N_{TA,offset}/2 + 6032 - T_D \cdot 64) \cdot T_c & \mu = 2 \end{cases}, \text{ or}$$

$$T_{delta} = \begin{cases} \lfloor(-N_{TA,offset}/2 + 6256 - T_D T_D \cdot 64)/64\rfloor \cdot 64 T_c & \mu = 0 \\ \lfloor(-N_{TA,offset}/2 + 6128 - T_D \cdot 64)/64\rfloor \cdot 64 T_c & \mu = 1 \\ \lfloor(-N_{TA,offset}/2 + 6032 - T_D \cdot 64)/64\rfloor \cdot 64 T_c & \mu = 2 \end{cases}, \text{ or}$$

$$T_{delta} = \begin{cases} \lceil(-N_{TA,offset}/2 + 6256 - T_D T_D \cdot 64)/64\rceil \cdot 64 T_c & \mu = 0 \\ \lceil(-N_{TA,offset}/2 + 6128 - T_D \cdot 64)/64\rceil \cdot 64 T_c & \mu = 1 \\ \lceil(-N_{TA,offset}/2 + 6032 - T_D \cdot 64)/64\rceil \cdot 64 T_c & \mu = 2 \end{cases}.$$

For the FR2, for example, the total range of $T_D$ may be $\{0, 1, 2, \ldots, 1199\}$.

For $\mu=2$, that is, $\Delta f$ is 60 kHz, $N_{B,offset}$ is 6032, $T_{D,offset}$ is 0, and $N_G$ is $32T_c$, the range of $T_D$ may be $\{0, 1, 2, \ldots, 740+n\}$, where n may be 0.

For $\mu=3$, that is, $\Delta f$ is 120 kHz, $N_{B,offset}$ is 6032, $T_{D,offset}$ is 0, and $N_G$ is $32T_c$, the range of $T_D$ may be $\{0, 1, 2, \ldots, 464+n\}$, where n may be 0.

$$T_{delta} = \begin{cases} (-N_{TA,offset}/2 + 6032 - T_D \cdot 32) \cdot T_c & \mu = 2 \\ (-N_{TA,offset}/2 + 6032 - T_D \cdot 32) \cdot T_c & \mu = 3 \end{cases}, \text{ or}$$

$$T_{delta} = \begin{cases} \lfloor (-N_{TA,offset}/2 + 6032 - T_D \cdot 32)/32 \rfloor \cdot 32T_c & \mu = 2 \\ \lfloor (-N_{TA,offset}/2 + 6032 - T_D \cdot 32)/32 \rfloor \cdot 32T_c & \mu = 3 \end{cases}, \text{ or}$$

$$T_{delta} = \begin{cases} \lceil (-N_{TA,offset}/2 + 6032 - T_D \cdot 32)/32 \rceil \cdot 32T_c & \mu = 2 \\ \lceil (-N_{TA,offset}/2 + 6032 - T_D \cdot 32)/32 \rceil \cdot 32T_c & \mu = 3 \end{cases}.$$

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

In an exemplary implementation manner, the FR may be distinguished, and different sub-carrier spacings correspond to different baseline offsets.

For example, the total range of $T_D$ may be $\{0, 1, 2, \ldots, 1199\}$.

For $\mu=0$, that is, $\Delta f$ is 15 kHz, $N_{B,offset}$ is $-70528$, $T_{D,offset}$ is 0, and $N_G$ is $64T_c$, the range of $T_D$ may be $\{0, 1, 2, \ldots, 1199+n\}$, where n may be 0.

For $\mu=1$, that is, $\Delta f$ is 30 kHz, $N_{B,offset}$ is $-70528$, $T_{D,offset}$ is 550, and $N_G$ is $64T_c$, the range of $T_D$ may be $\{0, 1, 2, \ldots, 647+n\}$, where n may be 0.

For $\mu=2$, that is, $\Delta f$ is 60 kHz, $N_{B,offset}$ is $-17664$, $T_{D,offset}$ is 0, and $N_G$ is $32T_c$, the range of $T_D$ may be $\{0, 1, 2, \ldots, 740+n\}$, where n may be 0.

For $\mu=3$, that is, $\Delta f$ is 120 kHz, $N_{B,offset}$ is $-17664$, $T_{D,offset}$ is 277, and $N_G$ is $32T_c$, the range of $T_D$ may be $\{0, 1, 2, \ldots, 463+n\}$, where n may be 0.

$$T_{delta} = \begin{cases} (-N_{TA,offset}/2 - 70528 + T_D \cdot 64) \cdot T_c & \mu = 0 \\ (-N_{TA,offset}/2 - 70528 + (T_D + 550) \cdot 64) \cdot T_c & \mu = 1 \\ (-N_{TA,offset}/2 - 17664 + T_D \cdot 32) \cdot T_c & \mu = 2 \\ (-N_{TA,offset}/2 - 17664 + (T_D + 277) \cdot 32) \cdot T_c & \mu = 3 \end{cases}, \text{ or}$$

$$T_{delta} = \begin{cases} \lfloor (-N_{TA,offset}/2 - 70528 + T_D \cdot 64)/64 \rfloor \cdot 64T_c & \mu = 0 \\ \lfloor (-N_{TA,offset}/2 - 70528 + (T_D + 550) \cdot 64)/64 \rfloor \cdot 64T_c & \mu = 1 \\ \lfloor (-N_{TA,offset}/2 - 17664 + T_D \cdot 32)/32 \rfloor \cdot 32T_c & \mu = 2 \\ \lfloor (-N_{TA,offset}/2 - 17664 + (T_D + 277) \cdot 32)/32 \rfloor \cdot 32T_c & \mu = 3 \end{cases}, \text{ or}$$

$$T_{delta} = \begin{cases} \lceil (-N_{TA,offset}/2 - 70528 + T_D \cdot 64)/64 \rceil \cdot 64T_c & \mu = 0 \\ \lceil (-N_{TA,offset}/2 - 70528 + (T_D + 550) \cdot 64)/64 \rceil \cdot 64T_c & \mu = 1 \\ \lceil (-N_{TA,offset}/2 - 17664 + T_D \cdot 32)/32 \rceil \cdot 32T_c & \mu = 2 \\ \lceil (-N_{TA,offset}/2 - 17664 + (T_D + 277) \cdot 32)/32 \rceil \cdot 32T_c & \mu = 3 \end{cases}.$$

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

In an exemplary implementation manner, the FR may not be distinguished, and different sub-carrier spacings correspond to the same baseline offset.

For example, the total range of $T_D$ may be $\{0, 1, 2, \ldots, 1199\}$.

For $\mu=0$, that is, $\Delta f$ is 15 kHz, $N_{B,offset}$ is $-70528$, $T_{D,offset}$ is 0, and $N_G$ is $64T_c$, the range of $T_D$ may be $\{0, 1, 2, \ldots, 1199+n\}$, where n may be 0.

For $\mu=1$, that is, $\Delta f$ is 30 kHz, $N_{B,offset}$ is $-70528$, $T_{D,offset}$ is 550, and $N_G$ is $64T$ the range of $T_D$ may be $\{0, 1, 2, \ldots, 647+n\}$, where n may be 0.

For $\mu=2$, that is, $\Delta f$ is 60 kHz, $N_{B,offset}$ is $-70528$, $T_{D,offset}$ is 1652, and $N_G$ is $32T_c$, the range of D may be $\{0, 1, 2, \ldots, 740+n\}$, where n may be 0.

For $\mu=3$, that is, $\Delta f$ is 120 kHz, $N_{B,offset}$ is $-70528$, $T_{D,offset}$ is 1929, and $N_G$ is $32T_c$, the range of $T_D$ may be $\{0, 1, 2, \ldots, 463+n\}$, where n may be 0.

$$T_{delta} = \begin{cases} (-N_{TA,offset}/2 - 70528 + T_D \cdot 64) \cdot T_c & \mu = 0 \\ (-N_{TA,offset}/2 - 70528 + (T_D + 550) \cdot 64) \cdot T_c & \mu = 1 \\ (-N_{TA,offset}/2 - 70528 + (T_D + 1652) \cdot 32) \cdot T_c & \mu = 2 \\ (-N_{TA,offset}/2 - 70528 + (T_D + 1929) \cdot 32) \cdot T_c & \mu = 3 \end{cases}, \text{ or}$$

$$T_{delta} = \begin{cases} \lfloor (-N_{TA,offset}/2 - 70528 + T_D \cdot 64)/64 \rfloor \cdot 64T_c & \mu = 0 \\ \lfloor (-N_{TA,offset}/2 - 70528 + (T_D + 550) \cdot 64)/64 \rfloor \cdot 64T_c & \mu = 1 \\ \lfloor (-N_{TA,offset}/2 - 70528 + (T_D \cdot 1652)/32 \rfloor \cdot 32T_c & \mu = 2 \\ \lfloor (-N_{TA,offset}/2 - 70528 + (T_D + 1929) \cdot 32)/32 \rfloor \cdot 32T_c & \mu = 3 \end{cases}, \text{ or}$$

$$T_{delta} = \begin{cases} \lceil (-N_{TA,offset}/2 - 70528 + T_D \cdot 64)/64 \rceil \cdot 64T_c & \mu = 0 \\ \lceil (-N_{TA,offset}/2 - 70528 + (T_D + 550) \cdot 64)/64 \rceil \cdot 64T_c & \mu = 1 \\ \lceil (-N_{TA,offset}/2 - 70528 + (T_D + 1652) \cdot 32)/32 \rceil \cdot 32T_c & \mu = 2 \\ \lceil (-N_{TA,offset}/2 - 70528 + (T_D + 1929) \cdot 32)/32 \rceil \cdot 32T_c & \mu = 3 \end{cases}.$$

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

In an exemplary implementation manner, the FR may not be distinguished, and different sub-carrier spacings correspond to different baseline offsets.

For example, the total range of $T_D$ may be $\{0, 1, 2, \ldots, 1199\}$.

For $\mu=0$, that is, $\Delta f$ is 15 kHz, $N_{B,offset}$ is $-70528$, $T_{D,offset}$ is 0, and $N_G$ is $64T_c$, the range of $T_D$ may be $\{0, 1, 2, \ldots, 1199+n\}$, where n may be 0.

For $\mu=1$, that is, $\Delta f$ is 30 kHz, $N_{B,offset}$ is $-35328$, $T_{D,offset}$ is 0, and $N_G$ is $64T_c$, the range of $T_D$ may be $\{0, 1, 2, \ldots, 647+n\}$, where n may be 0.

For $\mu=2$, that is, $\Delta f$ is 60 kHz, $N_{B,offset}$–17664, $T_{D,offset}$ is 0, and $N_G$ is $32T_c$, the range of $T_D$ may be $\{0, 1, 2, \ldots, 740+n\}$, where n may be 0.

For $\mu=3$, that is, $\Delta f$ is 120 kHz, $N_{B,offset}$ is $-8816$, $T_{D,offset}$ is 0, and $N_G$ is $32T_c$, the range of $T_D$ may be $\{0, 1, 2, \ldots, 464+n\}$, where n may be 0.

$$T_{delta} = \begin{cases} (-N_{TA,offset}/2 - 70528 + T_D \cdot 64) \cdot T_c & \mu = 0 \\ (-N_{TA,offset}/2 - 35328 + T_D \cdot 64) \cdot T_c & \mu = 1 \\ (-N_{TA,offset}/2 - 17664 + T_D \cdot 32) \cdot T_c & \mu = 2 \\ (-N_{TA,offset}/2 - 8816 + T_D \cdot 32) \cdot T_c & \mu = 3 \end{cases}, \text{ or}$$

$$T_{delta} = \begin{cases} \lfloor (-N_{TA,offset}/2 - 70528 + T_D \cdot 64)/64 \rfloor \cdot 64T_c & \mu = 0 \\ \lfloor (-N_{TA,offset}/2 - 35328 + T_D \cdot 64)/64 \rfloor \cdot 64T_c & \mu = 1 \\ \lfloor (-N_{TA,offset}/2 - 17664 + T_D \cdot 32)/32 \rfloor \cdot 32T_c & \mu = 2 \\ \lfloor (-N_{TA,offset}/2 - 8816 + T_D \cdot 32)/32 \rfloor \cdot 32T_c & \mu = 3 \end{cases}, \text{ or}$$

$$T_{delta} = \begin{cases} \lceil (-N_{TA,offset}/2 - 70528 + T_D \cdot 64)/64 \rceil \cdot 64T_c & \mu = 0 \\ \lceil (-N_{TA,offset}/2 - 35328 + T_D \cdot 64)/64 \rceil \cdot 64T_c & \mu = 1 \\ \lceil (-N_{TA,offset}/2 - 17664 + T_D \cdot 32)/32 \rceil \cdot 32T_c & \mu = 2 \\ \lceil (-N_{TA,offset}/2 - 8816 + T_D \cdot 32)/32 \rceil \cdot 32T_c & \mu = 3 \end{cases}.$$

When the actual value of the timing parameter index corresponding to the configured $T_D$ exceeds the lower upper bound of the range of $T_D$, $T_{delta}$ is calculated by using the lower or upper bound of the range of $T_D$, or $T_D$ is considered as an error configuration and thus is ignored.

In an exemplary implementation manner, the FR may not be distinguished, and the timing parameter is mapped from the upper bound to the lower bound. The principle of mapping the timing parameter from the upper bound to the lower bound is the same as the principle of mapping the timing parameter from the lower bound to the upper bound (which is described in the above embodiment), which will not be described in detail herein.

For example, the total range of $T_D$ may be {0, 1, 2, ..., 1199}.

For μ=0, that is, Δf is 15 kHz, $N_{B,offset}$ is 6256, $T_{D,offset}$ is 0, and $N_G$ is $64T_c$, the range of $T_D$ may be {0, 1, 2, ..., 1199+n}, where n may be 0.

For μ=1, that is, Δf is 30 kHz, $N_{B,offset}$ is 6128, $T_{D,offset}$ is 0, and $N_G$ is $64T_c$, the range of $T_D$ may be {0, 1, 2, ..., 647+n}, where n may be 0.

For μ=2, that is, Δf is 60 kHz, $N_{B,offset}$ is 6032, $T_{D,offset}$ is 0, and $N_G$ is $32T_c$, the range of $T_D$ may be {0, 1, 2, ..., 740+n}, where n may be 0.

For μ=3, that is, Δf is 120 kHz, $N_{B,offset}$ is 6032, $T_{D,offset}$ is 0, and $N_G$ is $32T_c$, the range of $T_D$ may be {0, 1, 2, ..., 464+n}, where n may be 0.

$$T_{delta} = \begin{cases} (-N_{TA,offset}/2 + 6256 - T_D \cdot 64) \cdot T_c & \mu = 0 \\ (-N_{TA,offset}/2 + 6128 - T_D \cdot 64) \cdot T_c & \mu = 1 \\ (-N_{TA,offset}/2 + 6032 - T_D \cdot 32) \cdot T_c & \mu = 2 \\ (-N_{TA,offset}/2 + 6032 - T_D \cdot 32) \cdot T_c & \mu = 3 \end{cases}, \text{or}$$

$$T_{delta} = \begin{cases} \lfloor(-N_{TA,offset}/2 + 6256 - T_D \cdot 64)/64\rfloor \cdot 64T_c & \mu = 0 \\ \lfloor(-N_{TA,offset}/2 + 6128 - T_D \cdot 64)/64\rfloor \cdot 64T_c & \mu = 1 \\ \lfloor(-N_{TA,offset}/2 + 6032 - T_D \cdot 32)/32\rfloor \cdot 32T_c & \mu = 2 \\ \lfloor(-N_{TA,offset}/2 + 6032 - T_D \cdot 32)/32\rfloor \cdot 32T_c & \mu = 3 \end{cases}, \text{or}$$

$$T_{delta} = \begin{cases} \lceil(-N_{TA,offset}/2 + 6256 - T_D \cdot 64)/64\rceil \cdot 64T_c & \mu = 0 \\ \lceil(-N_{TA,offset}/2 + 6128 - T_D \cdot 64)/64\rceil \cdot 64T_c & \mu = 1 \\ \lceil(-N_{TA,offset}/2 + 6032 - T_D \cdot 32)/32\rceil \cdot 32T_c & \mu = 2 \\ \lceil(-N_{TA,offset}/2 + 6032 - T_D \cdot 32)/32\rceil \cdot 32T_c & \mu = 3 \end{cases}.$$

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

In an exemplary implementation manner, the FR may be distinguished, the sub-carrier spacing may not be distinguished, and the timing parameter is mapped from the lower bound to the upper bound.

For the FR1, for example, the total range of $T_D$ may be {0, 1, 2, ..., 1199}.

$N_{B,offset}$ is −70528, $T_{D,offset}$ is 0, $N_G$ is $64T_c$, and the range of $T_D$ may be {0, 1, 2, ..., 1199+n}, where n may be 0.

$T_{delta}=(-N_{TA,offset}/2-70528+T_D \cdot 64) \cdot T_c$, or $T_{delta}=\lfloor(-N_{TA,offset}/2-70528+T_D \cdot 64)/64\rfloor \cdot 64T_c$, or $T_{delta}=\lceil(-N_{TA,offset}/2-70528+T_D \cdot 64)/64\rceil \cdot 64T_c$.

For the FR2, for example, the total range of $T_D$ may be {0, 1, 2, ..., 1199}.

$N_{B,offset}$ is −17664, $T_{D,offset}$ is 0, $N_G$ is $32T_c$, and the range of $T_D$ may be {0, 1, 2, ..., 740+n}, where n may be 0.

$T_{delta}=(-N_{TA,offset}/2-17664+T_D \cdot 32) \cdot T_c$, or $T_{delta}=\lfloor(-N_{TA,offset}/2-17664+T_D \cdot 32)/32\rfloor \cdot 32T_c$, or $T_{delta}=\lceil(-N_{TA,offset}/2-17664+T_D \cdot 32)/32\rceil \cdot 32T_c$.

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

In an exemplary implementation manner, the FR may be distinguished, the sub-carrier spacing is not distinguished, and the timing parameter is mapped from the upper bound to the lower bound.

For the FR1, for example, the total range of $T_D$ may be {0, 1, 2, ..., 1199}.

$N_{B,offset}$ is 6256, $T_{D,offset}$ is 0, $N_G$ is $64T_c$, and the range of $T_D$ may be {0, 1, 2, ..., 1199+n}, where n may be 0.

$T_{delta}=(-N_{TA,offset}/2+6256-T_D \cdot 64) \cdot T_c$, or $T_{delta}=\lfloor(-N_{TA,offset}/2+6256-T_D \cdot 64)/64\rfloor \cdot 64T_c$, or $T_{delta}=\lceil(-N_{TA,offset}/2+6256-T_D \cdot 64)/64\rceil \cdot 64T_c$.

For the FR2, for example, the total range of $T_D$ may be {0, 1, 2, ..., 1199}.

$N_{B,offset}$ is 6032, $T_{D,offset}$ is 0, $N_G$, $32T_c$, and the range of $T_D$ may be {0, 1, 2, ..., 740+n}, where n may be 0.

$T_{delta}=(-N_{TA,offset}/2+6032-T_D \cdot 32) \cdot T_c$, or $T_{delta}=\lfloor(-N_{TA,offset}/2+6032-T_D \cdot 32)/32\rfloor \cdot 32T_c$, or $T_{delta}=\lceil(-N_{TA,offset}/2+6032-T_D \cdot 32)/32\rceil \cdot 32T_c$.

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

In an exemplary implementation manner, the FR may not be distinguished, the sub-carrier spacing may not be distinguished, and the timing parameter is mapped from the lower bound to the upper bound.

For example, the total range of $T_D$ may be {0, 1, 2, ..., 23991}.

$N_{B,offset}$ is −70528, $T_{D,offset}$ is 0, $N_G$ is $32T_c$, and the range of $T_D$ may be {0, 1, 2, ..., 2399+n}, where n may be 0.

$T_{delta}=(-N_{TA,offset}/2-70528+T_D \cdot 32) \cdot T_c$, or $T_{delta}=\lfloor(-N_{TA,offset}/2-70528+T_D \cdot 32)/32\rfloor \cdot 32T_c$, or $T_{delta}=\lceil(-N_{TA,offset}/2-70528+T_D \cdot 32)/32\rceil \cdot 32T_c$.

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

In an exemplary implementation manner, the FR may not be distinguished, the sub-carrier spacing may not be distinguished, and the timing parameter is mapped from the upper bound to the lower bound.

For example, the total range of $T_D$ may be {0, 1, 2, ..., 2399}.

$N_{B,offset}$ is 6256, $T_{D,offset}$ is 0, $N_G$ is $32T_c$ and the range of $T_D$ may be {0, 1, 2, ..., 2399+n}, where n may be 0.

$T_{delta}=(-N_{TA,offset}/2+6256-T_D \cdot 32) \cdot T_c$, or $T_{delta}=\lfloor(-N_{TA,offset}/2+6256-T_D \cdot 32)/32\rfloor \cdot 32T_c$, or $T_{delta}=\lceil(-N_{TA,offset}/2+6256-T_D \cdot 32)/32\rceil \cdot 32T_c$.

When the actual value of the timing parameter index corresponding to the configured $T_D$ exceeds the lower or upper bound of the range of $T_D$, $T_{delta}$ is calculated by using the lower or upper bound of the range of $T_D$ or $T_D$ is considered as an error configuration and thus is ignored.

In an exemplary implementation manner, the FR may be distinguished, there are two timing parameter ranges having a range overlap, the sub-carrier spacing is not distinguished, and the timing parameter is mapped from the lower bound to the upper bound.

For the FR1, for example, the total range of $T_D$ may be {0, 1, 2, . . . , 1573}.

$N_{B,offset}$ is −70528, $T_{D,offset}$ is 0, $N_G$ is $64T_c$, and the range of $T_D$ may be {0, 1, 2, . . . , 825+n}, where n may be 0.

$T_{delta}=(-N_{TA,offset}/2-70528+T_D \cdot 64) \cdot T_c$, or $T_{delta}\lfloor(-N_{TA,offset}/2-70528+T_D \cdot 64)/64\rfloor \cdot 64T_c$, or $T_{delta}=\lceil(-N_{TA,offset}/2-70528+T_D \cdot 64)/64\rceil \cdot 64T_c$.

For the FR1 and FR2, for example, the total range of $T_D$ may be {0, 1, 2, . . . , 1573}.

$N_{B,offset}$ is −44096, $T_{D,offset}$ is 0, $N_G$ is $32T_c$, and the range of $T_D$ may be {826, 828, . . . , 1573+n}, where n may be 0.

$T_{delta}=(-N_{TA,offset}/2-44096+T_D \cdot 32) \cdot T_c$, or $T_{delta}=\lfloor(-N_{TA,offset}/2-44096+T_D \cdot 32)/32\rfloor \cdot 32T_c$, or $T_{delta}=\lceil(-N_{TA,offset}/2-44096+T_D \cdot 32)/32\rceil \cdot 32T_c$.

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

In an exemplary implementation manner, the FR may be distinguished, there are two timing parameter ranges having a range overlap, the sub-carrier spacing is not distinguished, and the timing parameter is mapped from the upper bound to the lower bound.

For the FR1 and FR2, for example, the total range of $T_D$ may be {0, 1, 2, . . . , 1574}.

$N_{B,offset}$ is 6256, $T_{D,offset}$ is 0, $N_G$ is $32T_c$ and the range of $T_D$ may be {0, 1, 2, . . . , 747+n}, where n may be 0.

$T_{delta}=(-N_{TA,offset}/2+6256-T_D \cdot 32) \cdot T_c$, or $T_{delta}\lfloor(-N_{TA,offset}/2+6256-T_D \cdot 32)/32\rfloor \cdot 32T_c$, or $T_{delta}=\lceil(-N_{TA,offset}/2+6256-T_D \cdot 32)/32\rceil \cdot 32T_c$.

For the FR1, for example, the total range of $T_D$ may be {0, 1, 2, . . . , 1574}.

$N_{B,offset}$ is 30208, $T_{D,offset}$ is 0, $N_G$ is $64T_c$, and the range of $T_D$ may be {748, 749, 750, . . . , 1574+n}, where n may be 0.

$T_{delta}=(-N_{TA,offset}/2+30208-T_D \cdot 64) \cdot T_c$, or $T_{delta}=\lfloor(-N_{TA,offset}/2+30208-T_D \cdot 64)/64\rfloor \cdot 64T_c$, or $T_{delta}=\lceil(-N_{TA,offset}/2+30208-T_D \cdot 64)/64\rceil \cdot 64T_c$.

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

In an exemplary implementation manner, the FR may be distinguished, there are three timing parameter ranges having a range overlap, the sub-carrier spacing is not distinguished, and the timing parameter is mapped from the lower bound to the upper bound.

For the FR1, for example, the total range of $T_D$ may be {0, 1, 2, . . . , 1570}.

$N_{B,offset}$ is −70528, $T_{D,offset}$ is 0, $N_G$ is $64T_c$, and the range of $T_D$ may be {0, 1, 2, . . . , 825+n}, where n may be 0.

$T_{delta}=(-N_{TA,offset}/2-70528+T_D \cdot 64) \cdot T_c$, or $T_{delta}\lfloor(-N_{TA,offset}/2-70528+T_D \cdot 64)/64\rfloor \cdot 64T_c$, or $T_{delta}=\lceil(-N_{TA,offset}/2-70528+T_D \cdot 64)/64\rceil \cdot 64T_c$.

For the FR1 and FR2, for example, the total range of $T_D$ may be {0, 1, 2, . . . , 1570}.

$N_{B,offset}$ is −44096, $T_{D,offset}$ is 0, $N_G$ is $32T_c$, and the range of $T_D$ may be {826, 827, 828, . . . , 1566+n}, where n may be 0.

$T_{delta}=(-N_{TA,offset}/2-44096+T_D \cdot 32) \cdot T_c$, or $T_{delta}=\lfloor(-N_{TA,offset}/2-44096+T_D \cdot 32)/32\rfloor \cdot 32T_c$, or $T_{delta}=\lceil(-N_{TA,offset}/2-44096+T_D \cdot 32)/32\rceil \cdot 32T_c$.

For the FR1, for example, the total range of $T_D$ may be {0, 1, 2, . . . , 1570}.

$N_{B,offset}$ is −94256, $T_{D,offset}$ is 0, $N_G$ is $64T_c$, and the range of $T_D$ may be {1567, 1568, 1569, 1570+n}, where n may be 0.

$T_{delta}=(-N_{TA,offset}/2-94256+T_D \cdot 64) \cdot T_c$, or $T_{delta}\lfloor(-N_{TA,offset}/2-94256+T_D \cdot 64)/64\rfloor \cdot 64T_c$, or $T_{delta}=\lceil(-N_{TA,offset}/2-94256+T_D \cdot 64)/64\rceil \cdot 64T_c$.

When the actual value of the timing parameter index corresponding to the configured $T_D$ exceeds the lower or upper bound of the range of $T_D$, $T_{delta}$ is calculated by using the lower or upper bound of the range of $T_D$ or $T_D$ is considered as an error configuration and thus is ignored.

In an exemplary implementation manner, the FR may be distinguished, there are three timing parameter ranges having a range overlap, the sub-carrier spacing is not distinguished, and the timing parameter is mapped from the upper bound to the lower bound.

For the FR1, for example, the total range of $T_D$ may be {0, 1, 2, . . . , 1571}.

$N_{B,offset}$ is 6256, $T_{D,offset}$ is 0, $N_G$ is $64T_c$, and the range of $T_D$ may be {0, 1, 2, 3+n}, where n may be 0.

$T_{delta}=(-N_{TA,offset}/2+6256-T_D \cdot 64) \cdot T_c$, or $T_{delta}=\lfloor(-N_{TA,offset}/2+6256-T_D \cdot 64)/64\rfloor \cdot 64T_c$, or $T_{delta}=\lceil(-N_{TA,offset}/2+6256-T_D \cdot 64)/64\rceil \cdot 64T_c$.

When the actual value of the timing parameter index corresponding to the configured $T_D$ exceeds the lower or upper bound of the range of $T_D$, $T_{delta}$ is calculated by using the lower or upper bound of the range of $T_D$, or $T_D$ is considered as an error configuration and thus is ignored.

For the FR1 and FR2, for example, the total range of $T_D$ may be {0, 1, 2, . . . , 1571}.

$N_{B,offset}$ is 6160, $T_{D,offset}$ is 0, $N_G$ is $32T_c$, and the range of $T_D$ may be {4, 5, 6, . . . , 744+n}, where n may be 0.

$T_{delta} = (-N_{TA,offset}/2 + 6160 - T_D \cdot 32) \cdot T_c$, or $T_{delta} = \lfloor (-N_{TA,offset}/2 + 6160 - T_D \cdot 32)/32 \rfloor \cdot 32 T_c$, or $T_{delta} = \lceil (-N_{TA,offset}/2 + 6160 - T_D \cdot 32)/32 \rceil \cdot 32 T_c$.

For the FR1, for example, the total range of $T_D$ may be {0, 1, 2, . . . , 1571}.

$N_{B,offset}$ is 30016, $T_{D,offset}$ is 0, $N_G$ is $64 T_c$, and the range of $T_D$ may be {745, 746, 747, . . . , 1571+n}, where n may be 0.

$T_{delta} = (-N_{TA,offset}/2 + 30016 - T_D \cdot 64) \cdot T_c$, or $T_{delta} = \lfloor (-N_{TA,offset}/2 + 30016 - T_D \cdot 64)/64 \rfloor \cdot 64 T_c$, or $T_{delta} = \lceil (-N_{TA,offset}/2 + 30016 - T_D \cdot 64)/64 \rceil \cdot 64 T_c$.

In an exemplary implementation manner, the timing parameter $T_{delta}$ may be obtained in a table look-up manner based on the parameter.

In an exemplary implementation manner, the timing parameter may be mapped from the lower bound to the upper bound, a gird position is indexed and calculated to obtain the timing parameter $T_{delta}$.

Table 1 is a table of partial content of the timing parameter. As shown in Table 1, for μ=2, that is, Δf is 15 kHz, $N_{B,offset}$ is −70528, and $N_G$ is $64 T_c$, the range of $T_D$ may be {0, 1, 2, . . . , 1199+n}, where $i = \lfloor T_D/k \rfloor$, $j = \text{mod}(T_D, k)$ and $1 \leq k \leq 2^{O_B}$.

For example, when $T_D = 12$ and $k = 10$, $i = \lfloor 12/10 \rfloor = 1$, and $j = \text{mod}(12,10) = 2$, that is, $T_D = 12$ represents a grid at a row $i = 1$ and a column $j = 2$ in the table, and the value in this grid represents the corresponding $T_{delta}$. In this example, $T_{delta} = -N_{TA,offset}/2 - 69760$.

In the table, "R" means that the value in the grid is reserved, or that the corresponding grid does not exist.

TABLE 1

| | | | | Δf = 15 kHz, $N_{B,offset}$ = −70528, $N_G$ = $64 T_c$ | | | | | | |
|---|---|---|---|---|---|---|---|---|---|---|
| | | | | j | | | | | | |
| i | 0 | 1 | 2 | 3 | 4 | 5 | 6 | 7 | 8 | 9 |
| 0 | −70528 | −70464 | −70400 | −70336 | −70272 | −70208 | −70144 | −70080 | −70016 | −69952 |
| 1 | −69888 | −69824 | −69760 | −69696 | −69632 | −69568 | −69504 | −69440 | −69376 | −69312 |
| . . . | . . . | . . . | . . . | . . . | . . . | . . . | . . . | . . . | . . . | . . . |
| 118 | 4992 | 5056 | 5120 | 5184 | 5248 | 5312 | 5376 | 5440 | 5504 | 5568 |
| 119 | 5632 | 5696 | 5760 | 5824 | 5888 | 5952 | 6016 | 6080 | 6144 | 6208 |
| 120 | R | R | R | R | R | R | R | R | R | R |
| . . . | R | R | R | R | R | R | R | R | R | R |
| 6552 | R | R | R | R | R | R | R | R | R | R |
| 6553 | R | R | R | R | R | R | R | R | R | R |

| | | | | Δf = 30 kHz, $N_{B,offset}$ = −35328, $N_G$ = $64 T_c$ | | | | | | |
|---|---|---|---|---|---|---|---|---|---|---|
| | | | | j | | | | | | |
| i | 0 | 1 | 2 | 3 | 4 | 5 | 6 | 7 | 8 | 9 |
| 0 | −35328 | −35264 | −35200 | −35136 | −35072 | −35008 | −34944 | −34880 | −34816 | −34752 |
| 1 | −34688 | −34624 | −34560 | −34496 | −34432 | −34368 | −34304 | −34240 | −34176 | −34112 |
| . . . | . . . | . . . | . . . | . . . | . . . | . . . | . . . | . . . | . . . | . . . |
| 63 | 4992 | 5056 | 5120 | 5184 | 5248 | 5312 | 5376 | 5440 | 5504 | 5568 |
| 64 | 5632 | 5696 | 5760 | 5824 | 5888 | 5952 | 6016 | 6080 | R | R |
| . . . | R | R | R | R | R | R | R | R | R | R |
| 119 | R | R | R | R | R | R | R | R | R | R |
| 120 | R | R | R | R | R | R | R | R | R | R |
| . . . | R | R | R | R | R | R | R | R | R | R |
| 6552 | R | R | R | R | R | R | R | R | R | R |
| 6553 | R | R | R | R | R | R | R | R | R | R |

| | | | | Δf = 60 kHz, $N_{B,offset}$ = −17664, $N_G$ = $64 T_c$ | | | | | | |
|---|---|---|---|---|---|---|---|---|---|---|
| | | | | j | | | | | | |
| i | 0 | 1 | 2 | 3 | 4 | 5 | 6 | 7 | 8 | 9 |
| 0 | −17664 | −17600 | −17536 | −17472 | −17408 | −17344 | −17280 | −17216 | −17152 | −17088 |
| 1 | −17024 | −16960 | −16896 | −16832 | −16768 | −16704 | −16640 | −16576 | −16512 | −16448 |
| . . . | . . . | . . . | . . . | . . . | . . . | . . . | . . . | . . . | . . . | . . . |
| 36 | 5376 | 5440 | 5504 | 5568 | 5632 | 5696 | 5760 | 5824 | 5888 | 5952 |
| 37 | 6016 | R | R | R | R | R | R | R | R | R |
| . . . | R | R | R | R | R | R | R | R | R | R |
| 119 | R | R | R | R | R | R | R | R | R | R |
| 120 | R | R | R | R | R | R | R | R | R | R |
| . . . | R | R | R | R | R | R | R | R | R | R |
| 6552 | R | R | R | R | R | R | R | R | R | R |
| 6553 | R | R | R | R | R | R | R | R | R | R |

| | | | | Δf = 60 kHz, $N_{B,offset}$ = −17664, $N_G$ = $32 T_c$ | | | | | | |
|---|---|---|---|---|---|---|---|---|---|---|
| | | | | j | | | | | | |
| i | 0 | 1 | 2 | 3 | 4 | 5 | 6 | 7 | 8 | 9 |
| 0 | −17664 | −17632 | −17600 | −17568 | −17536 | −17504 | −17472 | −17440 | −17408 | −17376 |
| 1 | −17344 | −17312 | −17280 | −17248 | −17216 | −17184 | −17152 | −17120 | −17088 | −17056 |

TABLE 1-continued

| ... | ... | ... | ... | ... | ... | ... | ... | ... | ... | ... |
|---|---|---|---|---|---|---|---|---|---|---|
| 73 | 5696 | 5728 | 5760 | 5792 | 5824 | 5856 | 5888 | 5920 | 5952 | 5984 |
| 74 | 6016 | R | R | R | R | R | R | R | R | R |
| ... | R | R | R | R | R | R | R | R | R | R |
| 119 | R | R | R | R | R | R | R | R | R | R |
| 120 | R | R | R | R | R | R | R | R | R | R |
| ... | R | R | R | R | R | R | R | R | R | R |
| 6552 | R | R | R | R | R | R | R | R | R | R |
| 6553 | R | R | R | R | R | R | R | R | R | R |

| $\Delta f = 120$ kHz, $N_{B, offset} = -8816$, $N_G = 32T_c$ | | | | | | | | | | |
|---|---|---|---|---|---|---|---|---|---|---|
| | | | | | j | | | | | |
| i | 0 | 1 | 2 | 3 | 4 | 5 | 6 | 7 | 8 | 9 |
| 0 | −8816 | −8784 | −8752 | −8720 | −8688 | −8656 | −8624 | −8592 | −8560 | −8528 |
| 1 | −8496 | −8464 | −8432 | −8400 | −8368 | −8336 | −8304 | −8272 | −8240 | −8208 |
| ... | ... | ... | ... | ... | ... | ... | ... | ... | ... | ... |
| 45 | 5584 | 5616 | 5648 | 5680 | 5712 | 5744 | 5776 | 5808 | 5840 | 5872 |
| 46 | 5904 | 5936 | 5968 | 6000 | 6032 | R | R | R | R | R |
| ... | R | R | R | R | R | R | R | R | R | R |
| 119 | R | R | R | R | R | R | R | R | R | R |
| 120 | R | R | R | R | R | R | R | R | R | R |
| ... | R | R | R | R | R | R | R | R | R | R |
| 6552 | R | R | R | R | R | R | R | R | R | R |
| 6553 | R | R | R | R | R | R | R | R | R | R |

In an exemplary implementation manner, the timing parameter may be mapped from the upper bound to the lower bound, the gird position is indexed and calculated to obtain the timing parameter $T_{delta}$.

Table 2 is a table of partial content of the timing parameter. As shown in Table 2, for $\mu=3$, that is, $\Delta f$ is 120 kHz, $N_{B,offset}$ is 6032, and $N_G$ is $32T_c$, the range of $T_D$ may be $\{0, 1, 2, \ldots, 464+n\}$, where n may be 0, $i=\lfloor T_D/k \rfloor$, $j=\mathrm{mod}(T_D, k)$ and $1 \le k \le 2^{O_B}$.

For example, when $T_D=15$ and k=10, $i=\lfloor 15/10 \rfloor=1$ and $j=\mathrm{mod}(15,10)=5$, that is, $T_D=15$ represents a gird at a row $i=1$ and a column $j=5$ in the table, and the value in the grid represents the corresponding $T_{delta}$. In this example, $T_{delta}=-N_{TA,offset}/2+5552$.

In the table, "R" means that the value in the grid is reserved, or that the corresponding grid does not exist.

TABLE 2

| $\Delta f = 15$ kHz, $N_{B, offset} = 6256$, $N_G = 64T_c$ | | | | | | | | | | |
|---|---|---|---|---|---|---|---|---|---|---|
| | | | | | j | | | | | |
| i | 0 | 1 | 2 | 3 | 4 | 5 | 6 | 7 | 8 | 9 |
| 0 | 6256 | 6192 | 6128 | 6064 | 6000 | 5936 | 5872 | 5808 | 5744 | 5680 |
| 1 | 5616 | 5552 | 5488 | 5424 | 5360 | 5296 | 5232 | 5168 | 5104 | 5040 |
| ... | ... | ... | ... | ... | ... | ... | ... | ... | ... | ... |
| 118 | −69264 | −69328 | −69392 | −69456 | −69520 | −69584 | −69648 | −69712 | −69776 | −69840 |
| 119 | −69904 | −69968 | −70032 | −70096 | −70160 | −70224 | −70288 | −70352 | −70416 | −70480 |
| 120 | R | R | R | R | R | R | R | R | R | R |
| ... | R | R | R | R | R | R | R | R | R | R |
| 6552 | R | R | R | R | R | R | R | R | R | R |
| 6553 | R | R | R | R | R | R | R | R | R | R |

| $\Delta f = 30$ kHz, $N_{B, offset} = 6128$, $N_G = 64T_c$ | | | | | | | | | | |
|---|---|---|---|---|---|---|---|---|---|---|
| | | | | | j | | | | | |
| i | 0 | 1 | 2 | 3 | 4 | 5 | 6 | 7 | 8 | 9 |
| 0 | 6128 | 6064 | 6000 | 5936 | 5872 | 5808 | 5744 | 5680 | 5616 | 5552 |
| 1 | 5488 | 5424 | 5360 | 5296 | 5232 | 5168 | 5104 | 5040 | 4976 | 4912 |
| ... | ... | ... | ... | ... | ... | ... | ... | ... | ... | ... |
| 63 | −34192 | −34256 | −34320 | −34384 | −34448 | −34512 | −34576 | −34640 | −34704 | −34768 |
| 64 | −34832 | −34896 | −34960 | −35024 | −35088 | −35152 | −35216 | −35280 | R | R |
| ... | R | R | R | R | R | R | R | R | R | R |
| 119 | R | R | R | R | R | R | R | R | R | R |
| 120 | R | R | R | R | R | R | R | R | R | R |
| ... | R | R | R | R | R | R | R | R | R | R |
| 6552 | R | R | R | R | R | R | R | R | R | R |
| 6553 | R | R | R | R | R | R | R | R | R | R |

TABLE 2-continued $\Delta f = 60$ kHz, $N_{B, offset} = 6032$, $N_G = 64T_c$

| i | j=0 | 1 | 2 | 3 | 4 | 5 | 6 | 7 | 8 | 9 |
|---|---|---|---|---|---|---|---|---|---|---|
| 0 | 6032 | 5968 | 5904 | 5840 | 5776 | 5712 | 5648 | 5584 | 5520 | 5456 |
| 1 | 5392 | 5328 | 5264 | 5200 | 5136 | 5072 | 5008 | 4944 | 4880 | 4816 |
| ... | ... | ... | ... | ... | ... | ... | ... | ... | ... | ... |
| 36 | −17008 | −17072 | −17136 | −17200 | −17264 | −17328 | −17392 | −17456 | −17520 | −17584 |
| 37 | −17648 | R | R | R | R | R | R | R | R | R |
| ... | R | R | R | R | R | R | R | R | R | R |
| 119 | R | R | R | R | R | R | R | R | R | R |
| 120 | R | R | R | R | R | R | R | R | R | R |
| ... | R | R | R | R | R | R | R | R | R | R |
| 6552 | R | R | R | R | R | R | R | R | R | R |
| 6553 | R | R | R | R | R | R | R | R | R | R |

$\Delta f = 60$ kHz, $N_{B, offset} = 6032$, $N_G = 32T_c$

| i | j=0 | 1 | 2 | 3 | 4 | 5 | 6 | 7 | 8 | 9 |
|---|---|---|---|---|---|---|---|---|---|---|
| 0 | 6032 | 6000 | 5968 | 5936 | 5904 | 5872 | 5840 | 5808 | 5776 | 5744 |
| 1 | 5712 | 5680 | 5648 | 5616 | 5584 | 5552 | 5520 | 5488 | 5456 | 5424 |
| ... | ... | ... | ... | ... | ... | ... | ... | ... | ... | ... |
| 73 | −17328 | −17360 | −17392 | −17424 | −17456 | −17488 | −17520 | −17552 | −17584 | −17616 |
| 74 | −17648 | R | R | R | R | R | R | R | R | R |
| ... | R | R | R | R | R | R | R | R | R | R |
| 119 | R | R | R | R | R | R | R | R | R | R |
| 120 | R | R | R | R | R | R | R | R | R | R |
| ... | R | R | R | R | R | R | R | R | R | R |
| 6552 | R | R | R | R | R | R | R | R | R | R |
| 6553 | R | R | R | R | R | R | R | R | R | R |

$\Delta f = 120$ kHz, $N_{B, offset} = 6032$, $N_G = 32T_c$

| i | j=0 | 1 | 2 | 3 | 4 | 5 | 6 | 7 | 8 | 9 |
|---|---|---|---|---|---|---|---|---|---|---|
| 0 | 6032 | 6000 | 5968 | 5936 | 5904 | 5872 | 5840 | 5808 | 5776 | 5744 |
| 1 | 5712 | 5680 | 5648 | 5616 | 5584 | 5552 | 5520 | 5488 | 5456 | 5424 |
| ... | ... | ... | ... | ... | ... | ... | ... | ... | ... | ... |
| 45 | −8368 | −8400 | −8432 | −8464 | −8496 | −8528 | −8560 | −8592 | −8624 | −8656 |
| 46 | −8688 | −8720 | −8752 | −8784 | −8816 | R | R | R | R | R |
| ... | R | R | R | R | R | R | R | R | R | R |
| 119 | R | R | R | R | R | R | R | R | R | R |
| 120 | R | R | R | R | R | R | R | R | R | R |
| ... | R | R | R | R | R | R | R | R | R | R |
| 6552 | R | R | R | R | R | R | R | R | R | R |
| 6553 | R | R | R | R | R | R | R | R | R | R |

In an exemplary implementation manner, the timing parameter may be mapped from the lower bound to the upper bound, the gird position is indexed and calculated to obtain the timing parameter $T_{delta}$.

Table 3 is a table of partial content of the timing parameter. As shown in Table 3, for $\mu=0$, that is, $\Delta f$ is 15 kHz, $N_{B,offset}$ is −70528, and $N_G$, $64T_c$, the range of $T_D$ may be {0, 1, 2, ..., 1199+n}, where n may be 0.

For example, $T_D=12$ represents a grid corresponding to the index of 12 in the index range of 10 to 19, the value in the grid represents the corresponding $T_{delta}$. In this example, $T_{delta}=-N_{TA,offset}/2-69760$.

In the table, "R" means that the value in the grid is reserved, or that the corresponding grid does not exist.

TABLE 3

| $T_D$ | $\Delta f = 15$ kHz, $N_{B, offset} = -70528$, $N_G = 64T_c$ | | | | | | | | | |
|---|---|---|---|---|---|---|---|---|---|---|
| 0-9 | −70528 | −70464 | −70400 | −70336 | −70272 | −70208 | −70144 | −70080 | −70016 | −69952 |
| 10-19 | −69888 | −69824 | −69760 | −69696 | −69632 | −69568 | −69504 | −69440 | −69376 | −69312 |
| ... | ... | ... | ... | ... | ... | ... | ... | ... | ... | ... |
| 1180-1189 | 4992 | 5056 | 5120 | 5184 | 5248 | 5312 | 5376 | 5440 | 5504 | 5568 |
| 1190-1199 | 5632 | 5696 | 5760 | 5824 | 5888 | 5952 | 6016 | 6080 | 6144 | 6208 |
| 1200-1209 | R | R | R | R | R | R | R | R | R | R |
| ... | R | R | R | R | R | R | R | R | R | R |
| 65520-65529 | R | R | R | R | R | R | R | R | R | R |
| 65530-65539 | R | R | R | R | R | R | R | R | R | R |

TABLE 3-continued

| $T_D$ | $\Delta f = 30$ kHz, $N_{B, offset} = -35328$, $N_G = 64T_c$ | | | | | | | | | |
|---|---|---|---|---|---|---|---|---|---|---|
| 0-9 | −35328 | −35264 | −35200 | −35136 | −35072 | −35008 | −34944 | −34880 | −34816 | −34752 |
| 10-19 | −34688 | −34624 | −34560 | −34496 | −34432 | −34368 | −34304 | −34240 | −34176 | −34112 |
| ... | ... | ... | ... | ... | ... | ... | ... | ... | ... | ... |
| 630-639 | 4992 | 5056 | 5120 | 5184 | 5248 | 5312 | 5376 | 5440 | 5504 | 5568 |
| 640-649 | 5632 | 5696 | 5760 | 5824 | 5888 | 5952 | 6016 | 6080 | R | R |
| ... | R | R | R | R | R | R | R | R | R | R |
| 1190-1199 | R | R | R | R | R | R | R | R | R | R |
| 1200-1209 | R | R | R | R | R | R | R | R | R | R |
| ... | R | R | R | R | R | R | R | R | R | R |
| 65520-65529 | R | R | R | R | R | R | R | R | R | R |
| 65530-65539 | R | R | R | R | R | R | R | R | R | R |

| $T_D$ | $\Delta f = 60$ kHz, $N_{B, offset} = -17664$, $N_G = 64T_c$ | | | | | | | | | |
|---|---|---|---|---|---|---|---|---|---|---|
| 0-9 | −17664 | −17600 | −17536 | −17472 | −17408 | −17344 | −17280 | −17216 | −17152 | −17088 |
| 10-19 | −17024 | −16960 | −16896 | −16832 | −16768 | −16704 | −16640 | −16576 | −16512 | −16448 |
| ... | ... | ... | ... | ... | ... | ... | ... | ... | ... | ... |
| 360-639 | 5376 | 5440 | 5504 | 5568 | 5632 | 5696 | 5760 | 5824 | 5888 | 5952 |
| 370-379 | 6016 | R | R | R | R | R | R | R | R | R |
| ... | R | R | R | R | R | R | R | R | R | R |
| 1190-1199 | R | R | R | R | R | R | R | R | R | R |
| 1200-1209 | R | R | R | R | R | R | R | R | R | R |
| ... | R | R | R | R | R | R | R | R | R | R |
| 65520-65529 | R | R | R | R | R | R | R | R | R | R |
| 65530-65539 | R | R | R | R | R | R | R | R | R | R |

| $T_D$ | $\Delta f = 60$ kHz, $N_{B, offset} = -17664$, $N_G = 32T_c$ | | | | | | | | | |
|---|---|---|---|---|---|---|---|---|---|---|
| 0-9 | −17664 | −17632 | −17600 | −17568 | −17536 | −17504 | −17472 | −17440 | −17408 | −17376 |
| 10-19 | −17344 | −17312 | −17280 | −17248 | −17216 | −17184 | −17152 | −17120 | −17088 | −17056 |
| ... | ... | ... | ... | ... | ... | ... | ... | ... | ... | ... |
| 730-739 | 5696 | 5728 | 5760 | 5792 | 5824 | 5856 | 5888 | 5920 | 5952 | 5984 |
| 740-749 | 6016 | R | R | R | R | R | R | R | R | R |
| ... | R | R | R | R | R | R | R | R | R | R |
| 1190-1199 | R | R | R | R | R | R | R | R | R | R |
| 1200-1209 | R | R | R | R | R | R | R | R | R | R |
| ... | R | R | R | R | R | R | R | R | R | R |
| 65520-65529 | R | R | R | R | R | R | R | R | R | R |
| 65530-65539 | R | R | R | R | R | R | R | R | R | R |

| $T_D$ | $\Delta f = 120$ kHz, $N_{B, offset} = -8816$, $N_G = 32T_c$ | | | | | | | | | |
|---|---|---|---|---|---|---|---|---|---|---|
| 0-9 | −8816 | −8784 | −8752 | −8720 | −8688 | −8656 | −8624 | −8592 | −8560 | −8528 |
| 10-19 | −8496 | −8464 | −8432 | −8400 | −8368 | −8336 | −8304 | −8272 | −8240 | −8208 |
| ... | ... | ... | ... | ... | ... | ... | ... | ... | ... | ... |
| 450-459 | 5584 | 5616 | 5648 | 5680 | 5712 | 5744 | 5776 | 5808 | 5840 | 5872 |
| 460-469 | 5904 | 5936 | 5968 | 6000 | 6032 | R | R | R | R | R |
| ... | R | R | R | R | R | R | R | R | R | R |
| 1190-1199 | R | R | R | R | R | R | R | R | R | R |
| 1200-1209 | R | R | R | R | R | R | R | R | R | R |
| ... | R | R | R | R | R | R | R | R | R | R |
| 65520-65529 | R | R | R | R | R | R | R | R | R | R |
| 65530-65539 | R | R | R | R | R | R | R | R | R | R |

In an exemplary implementation manner, the timing parameter is mapped from the upper bound to the lower bound, the gird position is indexed in a table look-up manner.

Table 4 is a table of partial content of the timing parameter. As shown in Table 4, for μ=3, that is, Δf is 120 z, $N_{B,offset}$ is 6032, and $N_G$ is $32T_c$, the range of $T_D$ may be {0, 1, 2, . . . , 464+n}, where n may be 0.

For example, $T_D$=15 represents a grid corresponding to the index of 15 in the index range of 10 to 19, the value in the grid represents the corresponding $T_{delta}$. In this example, $T_{delta}=-N_{TA,offset}/2+5552$.

In the table, "R" means that the value in the grid is reserved, or that the corresponding grid does not exist.

TABLE 4

| $T_D$ | $\Delta f = 15$ kHz, $N_{B, offset} = 6256$, $N_G = 64T_c$ | | | | | | | | | |
|---|---|---|---|---|---|---|---|---|---|---|
| 0-9 | 6256 | 6192 | 6128 | 6064 | 6000 | 5936 | 5872 | 5808 | 5744 | 5680 |
| 10-19 | 5616 | 5552 | 5488 | 5424 | 5360 | 5296 | 5232 | 5168 | 5104 | 5040 |
| ... | ... | ... | ... | ... | ... | ... | ... | ... | ... | ... |
| 1180-1189 | −69264 | −69328 | −69392 | −69456 | −69520 | −69584 | −69648 | −69712 | −69776 | −69840 |
| 1190-1199 | −69904 | −69968 | −70032 | −70096 | −70160 | −70224 | −70288 | −70352 | −70416 | −70480 |
| 1200-1209 | R | R | R | R | R | R | R | R | R | R |
| ... | R | R | R | R | R | R | R | R | R | R |

TABLE 4-continued

| | | | | | | | | | | |
|---|---|---|---|---|---|---|---|---|---|---|
| 65520-65529 | R | R | R | R | R | R | R | R | R | R |
| 65530-65539 | R | R | R | R | R | R | R | R | R | R |

| $T_D$ | $\Delta f = 30$ kHz, $N_{B,\,offset} = 6128$, $N_G = 64T_c$ | | | | | | | | | |
|---|---|---|---|---|---|---|---|---|---|---|
| 0-9 | 6128 | 6064 | 6000 | 5936 | 5872 | 5808 | 5744 | 5680 | 5616 | 5552 |
| 10-19 | 5488 | 5424 | 5360 | 5296 | 5232 | 5168 | 5104 | 5040 | 4976 | 4912 |
| ... | ... | ... | ... | ... | ... | ... | ... | ... | ... | ... |
| 630-639 | −34192 | −34256 | −34320 | −34384 | −34448 | −34512 | −34576 | −34640 | −34704 | −34768 |
| 640-649 | −34832 | −34896 | −34960 | −35024 | −35088 | −35152 | −35216 | −35280 | R | R |
| ... | R | R | R | R | R | R | R | R | R | R |
| 1190-1199 | R | R | R | R | R | R | R | R | R | R |
| 1200-1209 | R | R | R | R | R | R | R | R | R | R |
| ... | R | R | R | R | R | R | R | R | R | R |
| 65520-65529 | R | R | R | R | R | R | R | R | R | R |
| 65530-65539 | R | R | R | R | R | R | R | R | R | R |

| $T_D$ | $\Delta f = 60$ kHz, $N_{B,\,offset} = 6032$, $N_G = 64T_c$ | | | | | | | | | |
|---|---|---|---|---|---|---|---|---|---|---|
| 0-9 | 6032 | 5968 | 5904 | 5840 | 5776 | 5712 | 5648 | 5584 | 5520 | 5456 |
| 10-19 | 5392 | 5328 | 5264 | 5200 | 5136 | 5072 | 5008 | 4944 | 4880 | 4816 |
| ... | ... | ... | ... | ... | ... | ... | ... | ... | ... | ... |
| 360-369 | −17008 | −17072 | −17136 | −17200 | −17264 | −17328 | −17392 | −17456 | −17520 | −17584 |
| 370-379 | −17648 | R | R | R | R | R | R | R | R | R |
| ... | R | R | R | R | R | R | R | R | R | R |
| 1190-1199 | R | R | R | R | R | R | R | R | R | R |
| 1200-1209 | R | R | R | R | R | R | R | R | R | R |
| ... | R | R | R | R | R | R | R | R | R | R |
| 65520-65529 | R | R | R | R | R | R | R | R | R | R |
| 65530-65539 | R | R | R | R | R | R | R | R | R | R |

| $T_D$ | $\Delta f = 60$ kHz, $N_{B,\,offset} = 6032$, $N_G = 32T_c$ | | | | | | | | | |
|---|---|---|---|---|---|---|---|---|---|---|
| 0-9 | 6032 | 6000 | 5968 | 5936 | 5904 | 5872 | 5840 | 5808 | 5776 | 5744 |
| 10-19 | 5712 | 5680 | 5648 | 5616 | 5584 | 5552 | 5520 | 5488 | 5456 | 5424 |
| ... | ... | ... | ... | ... | ... | ... | ... | ... | ... | ... |
| 730-739 | −17328 | −17360 | −17392 | −17424 | −17456 | −17488 | −17520 | −17552 | −17584 | −17616 |
| 740-749 | −17648 | R | R | R | R | R | R | R | R | R |
| ... | R | R | R | R | R | R | R | R | R | R |
| 1190-1199 | R | R | R | R | R | R | R | R | R | R |
| 1200-1209 | R | R | R | R | R | R | R | R | R | R |
| ... | R | R | R | R | R | R | R | R | R | R |
| 65520-65529 | R | R | R | R | R | R | R | R | R | R |
| 65530-65539 | R | R | R | R | R | R | R | R | R | R |

| $T_D$ | $\Delta f = 120$ kHz, $N_{B,\,offset} = 6032$, $N_G = 32T_c$ | | | | | | | | | |
|---|---|---|---|---|---|---|---|---|---|---|
| 0-9 | 6032 | 6000 | 5968 | 5936 | 5904 | 5872 | 5840 | 5808 | 5776 | 5744 |
| 10-19 | 5712 | 5680 | 5648 | 5616 | 5584 | 5552 | 5520 | 5488 | 5456 | 5424 |
| ... | ... | ... | ... | ... | ... | ... | ... | ... | ... | ... |
| 450-459 | −8368 | −8400 | −8432 | −8464 | −8496 | −8528 | −8560 | −8592 | −8624 | −8656 |
| 460-469 | −8688 | −8720 | −8752 | −8784 | −8816 | R | R | R | R | R |
| ... | R | R | R | R | R | R | R | R | R | R |
| 1190-1199 | R | R | R | R | R | R | R | R | R | R |
| 1200-1209 | R | R | R | R | R | R | R | R | R | R |
| ... | R | R | R | R | R | R | R | R | R | R |
| 65520-65529 | R | R | R | R | R | R | R | R | R | R |
| 65530-65539 | R | R | R | R | R | R | R | R | R | R |

In an exemplary implementation manner, the sub-carrier spacing is determined in the configured manner.

For example, the sub-carrier spacing is directly configured, and the configured sub-carrier spacing is taken as the determined sub-carrier spacing. Alternatively, for example, the sub-carrier spacing is indirectly configured, the uplink bandwidth part identifier (UL BWPID) is configured as "01", and then a sub-carrier spacing of a UL BWP corresponding to "01" is taken as the determined sub-carrier spacing. Alternatively, for example, the sub-carrier spacing is indirectly configured, the downlink (DL) carrier ID is configured as "00001", and then a sub-carrier spacing of a DL carrier corresponding to "00001" is taken as the determined sub-carrier spacing.

The calculation or table lookup of the timing parameter is performed by using the above-determined sub-carrier spacing.

In an exemplary implementation manner, the sub-carrier spacing is determined in the default manner.

For example, the signaling corresponding to the timing parameter index is carried on a DL BWP having the DL BWP ID of "01", and a sub-carrier spacing of the DL BWP corresponding to "01" is taken as the determined sub-carrier spacing. Alternatively, for example, the signaling corresponding to the timing parameter index is carried on a DL carrier having a DL carrier ID of "00001", and a sub-carrier spacing of the DL carrier corresponding to "00001" is taken as the determined sub-carrier spacing. Alternatively, for example, there are two activated UL BWPs having UL BWP IDs of "01" and "10", respectively, and these two UL BWPs may belong to the same UL carrier or different UL carriers, and the minimum one between a sub-carrier spacing of the UL BWP corresponding to "01" and a sub-carrier spacing of the UL BWP corresponding to "10" is taken as the determined sub-carrier spacing. Alternatively, for example, there are two activated UL carriers having UL carrier IDs of "00001" and "00010", respectively, and the minimum one between a sub-carrier spacing of the UL carrier corresponding to "00001" and a sub-carrier spacing of the UL carrier corresponding to "00010" is taken as the determined sub-carrier spacing.

The calculation or table lookup of the timing parameter is performed by using the determined sub-carrier spacing.

In an exemplary implementation manner, the frequency range may be determined in the default manner.

If determined sub-carrier spacings correspond to different frequency ranges, the frequency range is determined as the frequency range 1 or the frequency range 2.

For example, if there are multiple activated UL BWPs at the IAB node MT or the IAB node distributed unit (DU) side, where these BWPs have the same sub-carrier spacing (for example, 60 kHz) which is the maximum or minimum one among sub-carrier spacings of all activated UL BWPs, but these BWPs correspond to multiple different frequency ranges, the frequency range is determined as the frequency range 1 or the frequency range 2.

The multiple activated UL BWPs may belong to the same cell such as a serving cell for transmitting the signaling corresponding to the timing parameter index, or may belong to different cells such as multiple cells in one timing advance group (TAG).

The calculation or table lookup of the timing parameter is performed by using the determined sub-carrier spacing and the determined frequency range.

In an exemplary implementation manner, $[L_{\Delta f}, U_{\Delta f}]$ represents a timing parameter range excluding a component of $-N_{TA,offset}/2$.

L represents a lower bound of the timing parameter range, and U represents an upper bound of the timing parameter range. $L_{\Delta f}$ represents the lower bound of the timing parameter range corresponding to $\Delta f$, where the timing parameter range excludes the component of $-N_{TA,offset}/2$; and $U_{\Delta f}$ represents the upper bound of the timing parameter range corresponding to $\Delta f$, where the timing parameter range excludes the component of $-N_{TA,offset}/2$.

Table 5 is a timing parameter range table. As shown in Table 5, $L_{15}$ and $U_{15}$ respectively represent the lower bound and the upper bound of the timing parameter other than the component of $-N_{TA,offset}/2$ in a case of $\Delta f$ being 15 kHz. $L_{30}$ and $U_{30}$ respectively represent the lower bound and the upper bound of the timing parameter other than the component of $-N_{TA,offset}/2$ in a case of $\Delta f$ being 30 kHz. $L_{60}$ and $U_{60}$ respectively represent the lower bound and the upper bound of the timing parameter other than the component of $N_{TA,offset}/2$ in a case of $\Delta f$ being 60 kHz. $L_{120}$ and $U_{120}$ respectively represent the lower bound and the upper bound of the timing parameter other than the component of $-N_{TA,offset}/2$ in a case of $\Delta f$ being 120 kHz.

$L_{15}$ $L_{30}$ $L_{60}$ and $L_{120}$ each may have a positive value, 0, or a negative value, and $L_{15}$ $L_{30}$ $L_{60}$ and $L_{120}$ may have the same value. $U_{15}$, $U_{30}$, $U_{60}$, and $U_{120}$ each may have a positive value, 0, or a negative value, and $U_{15}$, $U_{30}$, $U_{60}$, and $U_{120}$ may have the same value. $L_{15}$ and $U_{15}$ may have the same absolute value. $L_{30}$ and $U_{30}$ may be the same. $L_{60}$ and $U_{60}$ may have the same absolute value. $L_{120}$ and $U_{120}$ may have the same absolute value. $N_{B,offset}$ have a value greater than or equal to the value of $L_{\Delta f}$. The value of $N_{B,offset}$ is less than or equal to the value of $U_{\Delta f}$.

TABLE 5

| $\Delta f$ [kHz] | Min $T_{delta}$ [Tc] | Max $T_{delta}$ [Tc] |
|---|---|---|
| 15 | $-N_{TA,\,offset}/2 + L_{15}$ | $-N_{TA,\,offset}/2 + U_{15}$ |
| 30 | $-N_{TA,\,offset}/2 + L_{30}$ | $-N_{TA,\,offset}/2 + U_{30}$ |
| 60 | $-N_{TA,\,offset}/2 + L_{60}$ | $-N_{TA,\,offset}/2 + U_{60}$ |
| 120 | $-N_{TA,\,offset}/2 + L_{120}$ | $-N_{TA,\,offset}/2 + U_{120}$ |

In an exemplary implementation manner, $[\overline{L_{\Delta f}}, \overline{U_{\Delta f}}]$ represents the timing parameter range unrelated to the component of $-N_{TA,offset}/2$.

$\overline{L}$ represents the lower bound of the timing parameter range, and $\overline{U}$ represents the upper bound of the timing parameter range. $\overline{L_{\Delta f}}$ represents the lower bound of the timing parameter range corresponding to $\Delta f$, and $\overline{U_{\Delta f}}$ represents the upper bound of the timing parameter range corresponding to $\Delta f$.

Table 6 is a timing parameter range table. As shown in Table 6, $\overline{L_{15}}$ and $\overline{U_{15}}$ respectively represent the lower bound and the upper bound of the timing parameter in a case of $\Delta f$ being 15 kHz. $\overline{L_{30}}$ and $\overline{U_{30}}$ respectively represent the lower bound and the upper bound of the timing parameter in a case of $\Delta f$ being 30 kHz. $\overline{L_{60}}$ and $\overline{U_{60}}$ respectively represent the lower bound and the upper bound of the timing parameter in a case of $\Delta f$ being 60 kHz. $\overline{L_{120}}$ and $\overline{U_{120}}$ respectively represent the lower bound and the upper bound of the timing parameter in a case of $\Delta f$ being 120 kHz.

$\overline{L_{15}}$, $\overline{L_{30}}$, $\overline{L_{60}}$, and $\overline{L_{120}}$ each may have a positive value, 0, or a negative value, and $\overline{L_{15}}$, $\overline{L_{30}}$, $\overline{L_{60}}$, and $\overline{L_{120}}$ may have the same value. $\overline{U_{15}}$, $\overline{U_{30}}$, $\overline{U_{60}}$, and $\overline{U_{120}}$ each may have a positive value, 0, or a negative value. $\overline{U_{15}}$, $\overline{U_{30}}$, $\overline{U_{60}}$, and $\overline{U_{120}}$ may have the same value. $\overline{L_{15}}$ and $\overline{U_{15}}$ may have the same absolute value. $\overline{L_{30}}$ and $\overline{U_{30}}$ may have the same absolute value. $\overline{L_{60}}$ and $\overline{U_{60}}$ may have the same absolute value. $\overline{L_{120}}$ and $\overline{U_{120}}$ may have the same absolute value. The value of $N_{B,offset}$ is greater than or equal to the value of $\overline{L_{\Delta f}}$. The value of $N_{B,offset}$ is less than or equal to the value of $\overline{U_{\Delta f}}$. The value of $\overline{L_{\Delta f}}$ is equal to $-N_{TA,offset}/2+L_{\Delta f}$. The value of $\overline{U_{\Delta f}}$ is equal to $-N_{TA,offset}/2+U_{\Delta f}$.

TABLE 6

| $\Delta f$ [kHz] | Min $T_{delta}$ [Tc] | Max $T_{delta}$ [Tc] |
|---|---|---|
| 15 | $\overline{L_{15}}$ | $\overline{U_{15}}$ |
| 30 | $\overline{L_{30}}$ | $\overline{U_{30}}$ |
| 60 | $\overline{L_{60}}$ | $\overline{U_{60}}$ |
| 120 | $\overline{L_{120}}$ | $\overline{U_{120}}$ |

In an exemplary implementation manner, different sub-carrier spacings correspond to different signaling overheads of the timing parameter index.

The signaling overhead of $T_D$ corresponding to each $\Delta f$ is that $O_B = \log_2((U_{\Delta f} - L_{\Delta f})/N_G)$. For example, $L_{15} = -128T_c$, $U_{15} = 128T_c$, and $N_G = 64T_c$ in a case where $\Delta f$ is 15 kHz; $L_{30} = -64T_c$, $U_{30} = 64T_c$, and $N_G = 64T_c$ in a case where $\Delta f$ is 30 kHz, and the signaling overhead of $T_D$ corresponding to $\Delta f$ of 15 kHz is that $O_B = \log_2((U_{\Delta f} - L)/N_G) = \log_2((128-(-128))/64) = 2$ bits, and the signaling overhead of $T_D$ corresponding to $\Delta f$ of 30 kHz is that $O_B = \log_2((U_{\Delta f} - L_{\Delta f})/N_G) = \log_2((64-(-64))/64) = 1$ bit.

In an exemplary implementation manner, different sub-carrier spacings correspond to the same signaling overhead of the timing parameter index.

The signaling overhead of $T_D$ corresponding to each $\Delta f$ is that $O_B = \max(\log_2((U_{\Delta f} - L_{\Delta f})/N_G))$, where max represents taking the maximum value. For example, $L_{15} = -128T_c$, $U_{15}=128T_c$, and $N_G=64T_c$ in a case where $\Delta f$ is 15 kHz; $L_{30}=-64T_c$, $U_{30}=64T_c$, and $N_G=64T_c$ in a case where $\Delta f$ is 30 kHz, and then the signaling overhead of $T_D$ corresponding to $\Delta f$ of 15 kHz or 30 kHz is that $$O_B=\max(\log_2((U_{\Delta f}-L_{\Delta f})/N_G))=\max(\log_2((128-(-128))/64,\log_2((64-(-64))/64))=\max(2,1)=2$$

bits.

In an exemplary implementation manner, there may be a uniform signaling overhead of the timing parameter index.

The signaling overhead of $T_D$ corresponding to all $\Delta f$ is that $O_B=\log_2((U_{\Delta f}-L_{\Delta f})/N_G)$. For example, when $L_{15}=L_{30}=L_{60}=L_{120}=0T_c$ and $U_{15}=U_{30}=U_{60}=U_{120}=65535\cdot N_G$, where $N_G=32T_c$, the signaling overhead of $T_D$ corresponding to all $\Delta f$ is that $O_B=\log_2((U_{\Delta f}-L_{\Delta f})/N_G)=\log_2((65535\cdot 32-0)/32)=16$ bits.

In an exemplary implementation manner, the timing advance granularity determined by the sub-carrier spacing is $16\cdot 64T_c/2^\mu$.

The timing advance available for 15 kHz is an integer multiple of the timing advance granularity $16\cdot 64T_c$, such as a timing advance set set_0 including $0\cdot 64T_c$, $\pm 16\cdot 64T_c$, $\pm 32\cdot 64T_c$, $\pm 48\cdot 64T_c$, $\pm 64\cdot 64T_c$, etc. The timing advance available for 30 kHz is an integer multiple of the timing advance granularity $8\cdot 64T_c$, such as a timing advance set set_1 including $0\cdot 64T_c$, $\pm 8\cdot 64T_c$, $16\cdot 64T_c$, $\pm 24\cdot 64T_c$, $\pm 32\cdot 64T_c$, etc. The timing advance available for 60 kHz is an integer multiple of the timing advance granularity $4\cdot 64T_c$, such as a timing advance set set_2 including $0\cdot 64T_c$, $\pm 4\cdot 64T_c$, $\pm 8\cdot 64T_c$, $12\cdot 64T_c$, $\pm 16\cdot 64T_c$, etc. The timing advance available for 120 kHz is an integer multiple of the timing advance granularity $2\cdot 64T_c$, such as a timing advance set set_3 including $0\cdot 64T_c$, $\pm 2\cdot 64T_c$, $\pm 4\cdot 64T_c$, $6\cdot 64T_c$, $\pm 8\cdot 64T_c$, etc.

In an exemplary implementation manner, the sub-carrier spacing may be determined as the maximum sub-carrier spacing by default.

For example, sub-carrier spacings of the two activated UL BWPs are 15 kHz and 60 kHz, respectively. These two sub-carrier spacings may be a sub-carrier spacing corresponding to a supplementary uplink bandwidth part and a sub-carrier spacing corresponding to a non-supplementary uplink bandwidth part, respectively.

For the parent node or the child node, $\max(15,60)=60$ kHz is taken as the sub-carrier spacing corresponding to the uniform timing advance granularity, that is, the uniform timing advance granularity is $4\cdot 64T_c$, the available timing advance is an integer multiple of the timing advance granularity $4\cdot 64T_c$, such as $0\cdot 64T_c$, $\pm 4\cdot 64T_c$, $\pm 8\cdot 64T_c$, $\pm 12\cdot 64T_c$, $\pm 16\cdot 64T_c$, etc.

In an exemplary implementation manner, the sub-carrier spacing may be pre-defined or configured.

For example, for the parent node or the child node, 120 kHz is pre-defined as the sub-carrier spacing corresponding to the uniform timing advance granularity, that is, the uniform timing advance granularity is $2\cdot 64T_c$, the available timing advance is an integer multiple of the timing advance granularity $2\cdot 64T_c$, such as $0\cdot 64T_c$, $\pm 2\cdot 64T_c$, $\pm 4\cdot 64T_c$, $\pm 6\cdot 64T_c$, $\pm 8\cdot 64T_c$, etc.

For example, the parent node configures for the child node or the child node is configured by the parent node that 120 kHz is used as the sub-carrier spacing corresponding to the uniform timing advance granularity, that is, the uniform timing advance granularity is $2\cdot 64T_c$, the available timing advance is an integer multiple of the timing advance granularity $2\cdot 64T_c$, such as $0\cdot 64T_c$, $\pm 2\cdot 64T_c$, $\pm 4\cdot 64T_c$, $\pm 6\cdot 64T_c$, $8\cdot 64T_c$, etc.

In an exemplary implementation manner, the integer multiple operation is not performed on the timing advance granularity.

Based on the above embodiments, when the node is located within the uplink bandwidth part having the sub-carrier spacing of 15 kHz, 15 kHz is less than the sub-carrier spacing of 60 kHz corresponding to the uniform timing advance granularity, that is, the timing advance at a given moment is three times the timing advance granularity $4\cdot 64T_c$, that is, the timing advance is $12\cdot 64T_c$.

The node does not take an integer multiple of the timing advance granularity $16\cdot 64T_c$ in the nearest value manner for $12\cdot 64T_c$ according to the value of the timing advance in the timing advance set set_0, that is, the node does not downward or upward adjust $12\cdot 64T_c$ to a value near the timing advance $0\cdot 64T_c$, or $16\cdot 64T_c$ in the timing advance set set_0, that is, the node still keeps the timing advance as $12\cdot 64T_c$.

In an exemplary implementation manner, the integer multiple operation is performed on the timing advance granularity.

Based on the above embodiments, when the node is located within the uplink bandwidth part having the sub-carrier spacing of 15 kHz, 15 kHz is less than the sub-carrier spacing of 60 kHz corresponding to the uniform timing advance granularity, that is, the timing advance at a given moment is three times the timing advance granularity $4\cdot 64T_c$, that is, the timing advance is $12\cdot 64T_c$.

The node takes as an integer multiple of the timing advance granularity $16\cdot 64T_c$, in the nearest value manner for $12\cdot 64T_c$ according to the value of the timing advance in the timing advance set set_0, that is, the node downward or upward adjusts $12\cdot 64T_c$ to a value nearest the timing advance $0\cdot 64T_c$ or $16\cdot 64T_c$ in the timing advance set set_0, that is, the node changes the timing advance $12\cdot 64T_c$ to downward $0\cdot 64T_c$ or upward $16\cdot 64T_c$.

In an exemplary implementation manner, whether the integer multiple operation is performed on the timing advance granularity is determined in the pre-defined or configured manner.

Based on the above embodiments, when the node is located within the uplink bandwidth part having the sub-carrier spacing of 15 kHz, 15 kHz is less than the sub-carrier spacing of 60 kHz corresponding to the uniform timing advance granularity, that is, the timing advance at a given moment is three times the timing advance granularity $4\cdot 64T_c$, that is, the timing advance is $12\cdot 64T_c$.

For example, for the parent node or the child node, whether an integer multiple of the timing advance granularity $16\cdot 64T_c$ according to the value of the timing advance in the timing advance set set_0 is taken for $12\cdot 64T_c$, in the nearest value manner is or is not pre-defined, that is, the node does or does not downward or upward adjust $12\cdot 64T_c$ to a value near the timing advance $0\cdot 64T_c$ or $16\cdot 64T_c$ in the timing advance set set_0, that is, the node still keeps the timing advance as $12\cdot 64T_c$.

For example, the parent node configures the child node to or the child node is configured by the parent node to take or not take an integer multiple of the timing advance granularity $16\cdot 64T_c$ in the nearest value manner for $12\cdot 64T_c$ according to the value of the timing advance in the timing advance set set_0, that is, the node does or does not downward or upward adjust $12\cdot 64T_c$ to a value near the timing advance $0\cdot 64T_c$ or $16\cdot 64T_c$ in the timing advance set set_0, that is, the node still keeps the timing advance as $12\cdot 64T_c$.

In an exemplary implementation manner, whether the integer multiple operation is performed on the timing advance granularity is determined in the feedback manner.

Based on the above embodiments, when the node is located within the uplink bandwidth part having the sub-carrier spacing of 15 kHz, 15 kHz is less than the sub-carrier spacing of 60 kHz corresponding to the uniform timing advance granularity, that is, the timing advance at a given moment is three times the timing advance granularity $4 \cdot 64T_c$, that is, the timing advance is $12 \cdot 64T_c$.

For example, the child node feeds back to the child node or the parent node receives the feedback from the child node whether an integer multiple of the timing advance granularity $16 \cdot 64T_c$, is taken in the nearest value method for $12 \cdot 64T_c$ according to the value of the timing advance in the timing advance set set_0, that is, the node does or does not downward or upward adjust $12 \cdot 64T_c$ to a value near the timing advance $0 \cdot 64T_c$ or $16 \cdot 64T_c$ in the timing advance set set_0, that is, the node still keeps the timing advance as $12 \cdot 64T_c$.

In an exemplary implementation manner, when a non-supplementary uplink (known as a Non-SUL or a NUL or a UL) and a supplementary uplink (SUL) exist, or, when a non-supplementary uplink bandwidth part (known as a Non-SUL BWP or a NUL BWP or a UL BWP) and a supplementary uplink bandwidth part (SUL BWP) exist, the timing difference is determined by at least one of the following manners:

configuring from which link the timing difference is measured; determining by default from which fixed link the timing difference is measured; or determining by default that the timing difference is measured from the link at the latest or last moment.

The manner of configuring from which link the timing difference is measured includes as follows.

For example, the parent node configures the child node or the child node is configured by the parent node that the timing difference is measured based on the UL receive (Rx), that is, the timing difference is configured from the UL; for another example, the parent node configures the child node or the child node is configured by the parent node that the timing difference is measured based on the SUL Rx, that is, the timing difference is configured from the SUL.

The manner of determining by default from which fixed link the timing difference is measured includes as follows.

For example, for the parent node or the child node, the timing difference is measured based on the UL Rx by default, that is, the timing difference is configured to be from the UL; for another example, for the parent node or the child node, the timing difference is measured based on the SUL Rx by default, that is, the timing difference is configured to be from the SUL.

The manner of determining by default that the timing difference is measured from the link at the latest or last moment includes as follows.

For example, for the parent node or the child node, it is determined by default that the timing difference is measured based on the uplink receive at the latest or last moment, that is, it is determined by default that the timing difference is from the uplink receive at the latest or last moment. Assuming that the UL is a moment t0, SUL is a moment t1, and the moment t1 is later than the moment t0, then it is determined by default that the timing difference is measured based on the SUL Rx, that is, it is determined by default that the timing difference is from the SUL.

In the scheme provided by the present disclosure, the problem of determining the actual timing difference by the timing parameter index is solved. The scheme provided in the present disclosure can ensure that the mapping from any timing parameter index to the actual timing parameter is supported on the basis of the signaling overhead, and that the radio frequency technical requirement is supported. In the wireless mobile communication system, no matter the expansion of the network coverage or the increase of the spectral efficiency of the dense cell, more base stations need to be deployed, the IAB can not only solve the above scenario, but also greatly reduce the capital investment and operation cost of the operator.

FIG. 2 is a structural diagram of a timing difference determination apparatus according to an embodiment of the present disclosure. The apparatus includes a determination module 210.

The determination module 210 is configured to determine a timing difference based on at least one of the following parameters: a parameter related to the timing parameter, a parameter related to a timing advance, or a parameter related to a physical resource.

In an exemplary implementation manner, the parameter related to the timing parameter includes at least one of a timing parameter index, a timing parameter index offset, a timing parameter range, a timing parameter granularity, or a baseline offset.

In an exemplary implementation manner, the parameter related to the timing advance includes at least one of a timing advance, a timing advance granularity, or a timing advance offset.

In an exemplary implementation manner, the parameter related to the physical resource includes a frequency range or a sub-carrier spacing.

In an exemplary implementation manner, the determination module 210 is configured to: determine the parameter related to the timing parameter and/or the parameter related to the timing advance based on the frequency range, and determine the timing difference based on the determined parameter related to the timing parameter and/or the determined parameter related to the timing advance.

In an exemplary implementation manner, the determination module 210 is configured to: determine the parameter related to the timing parameter and/or the parameter related to the timing advance based on the sub-carrier spacing, and determine the timing difference based on the determined parameter related to the timing parameter and/or the determined parameter related to the timing advance.

In an exemplary implementation manner, the sub-carrier spacing is determined in a configured manner or a default manner.

In an exemplary implementation manner, the sub-carrier spacing is determined based on at least one of the following manners: configuring a sub-carrier spacing; configuring a bandwidth part identifier, and determining a sub-carrier spacing of a bandwidth part corresponding to the bandwidth part identifier; or configuring a carrier identifier, and determining a sub-carrier spacing of a carrier corresponding to the carrier identifier.

In an exemplary implementation manner, the sub-carrier spacing is determined based on at least one of the following manners: determining a sub-carrier spacing corresponding to the timing advance granularity; determining a sub-carrier spacing of a bandwidth part in which signaling corresponding to a timing parameter index is located; determining one of the minimum sub-carrier spacing or the maximum sub-carrier spacing among sub-carrier spacings of bandwidth parts; or determining by a reference sub-carrier spacing of a bandwidth part.

In an exemplary implementation manner, the frequency range is determined based on a frequency range in which a bandwidth part or a carrier is located.

In an exemplary implementation manner, if determined sub-carrier spacings correspond to different frequency ranges, the frequency range is determined as a first frequency range or a second frequency range.

In an exemplary implementation manner, the sub-carrier spacing corresponding to the timing advance granularity is the maximum sub-carrier spacing among sub-carrier spacings of one or more activated uplink bandwidth parts.

In an exemplary implementation manner, the sub-carrier spacing corresponding to the timing advance granularity is a predefined or configured sub-carrier spacing.

In an exemplary implementation manner, in response to a sub-carrier spacing of an uplink bandwidth part corresponding to one of a non-supplementary uplink or a supplementary uplink being less than the sub-carrier spacing corresponding to the timing advance granularity, a timing advance granularity corresponding to the sub-carrier spacing of the uplink bandwidth part corresponding to the one of the non-supplementary uplink or the supplementary uplink is kept unchanged.

In an exemplary implementation manner, in response to a sub-carrier spacing of an uplink bandwidth part being less than the sub-carrier spacing corresponding to the timing advance granularity, the timing advance granularity corresponding to the sub-carrier spacing of the uplink bandwidth part is kept unchanged.

In an exemplary implementation manner, in response to a sub-carrier spacing of an uplink bandwidth part being less than the sub-carrier spacing corresponding to the timing advance granularity, the integer multiple operation is performed on the timing advance granularity corresponding to the sub-carrier spacing of the uplink bandwidth part.

In an exemplary implementation manner, in response to a sub-carrier spacing of an uplink bandwidth part being less than the sub-carrier spacing corresponding to the timing advance granularity, whether the integer multiple operation is performed on the timing advance granularity corresponding to the sub-carrier spacing of the uplink bandwidth part is determined in the pre-defined or configured manner.

In an exemplary implementation manner, in response to the sub-carrier spacing of the uplink bandwidth part being less than the sub-carrier spacing corresponding to the timing advance granularity, whether to perform the integer multiple operation on the timing advance granularity corresponding to the sub-carrier spacing of the uplink bandwidth part is determined based on a feedback manner.

In an exemplary implementation manner, in response to a non-supplementary uplink and a supplementary uplink existing, the timing difference is determined in the following manner: determining by default that the timing difference is measured based on an uplink receive at a latest or last moment; where the uplink receive at the latest or last moment is determined based on an uplink receive at the latest or last moment in the non-supplementary uplink and the supplementary uplink.

The apparatus performs the method provided in the embodiments of the present disclosure, and has the function module and the technical effect corresponding to the execution of the method.

Figure 3:
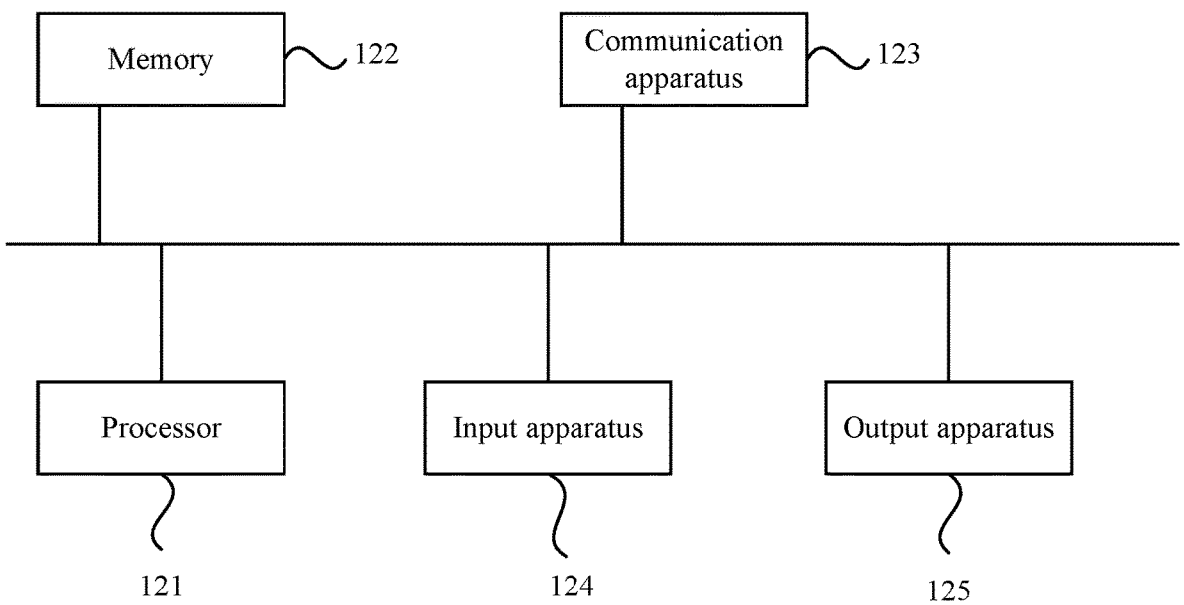
FIG. 3 is a structural diagram of a device according to an embodiment of the present disclosure.

The embodiments of the present disclosure further provide a device. FIG. 3 is a structural diagram of a device according to an embodiment of the present disclosure. As shown in FIG. 3, the device provided by the embodiment of the present disclosure includes one or more processors 121 and a memory 122. The processors 121 in the device may be one or more, and FIG. 3 uses one processor 121 as an example. The memory 122 is configured to store one or more programs which, when executed by the one or more processors 121, cause the one or more processors 121 to perform the method in the embodiments of the present disclosure.

The device further includes a communication apparatus 123, an input apparatus 124, and an output apparatus 125.

The processor 121, the memory 122, the communication apparatus 123, the input apparatus 124, and the output apparatus 125 are connected via a bus or in other manners, and FIG. 3 is illustrated by using an example in which the above components are connected via a bus.

The input apparatus 124 may be configured to receive the input information of digit or character, and generate signal input of a keyboard related to user setting and function control.

The communication apparatus 123 may include a receiver and a transmitter. The communication apparatus 123 is configured to perform communication of receiving and transmitting information according to the control of the processors 121.

The memory 122, as a computer-readable storage medium, is configured to store software programs and computer-executable programs and modules, such as program instructions/modules (for example, the determination module in the timing difference determination apparatus) corresponding to the timing difference determination method described in the embodiments of the present disclosure. The memory 122 may include a program storage area and a data storage area, where the program storage area may be configured to store the operating system and an application program required by at least one function required by. The data storage area may be configured to store data created according to the usage of the device. Moreover, the memory 122 may include a high random access memory and may also include a nonvolatile memory such as at least one of the magnetic disk storage device, the flash memory device, or other non-volatile solid-state memory devices. In some examples, the memory 122 may include memories disposed remotely relative to the processors 121, and these remote memories may be connected to the device via a network. Examples of the above network include, but are not limited to, the Internet, an intranet, a local area network, a mobile communication network, and a combination thereof.

The embodiments of the present disclosure further provide a storage medium. The storage medium is configured to store a computer program which, when executed by a processor, implements the method described in any one embodiment of the present disclosure.

When the computer program implements the timing difference determination method described in any one embodiment of the present disclosure, the method includes the step described below.

A timing difference is determined based on at least one of the following parameters: a parameter related to the timing parameter, a parameter related to a timing advance, or a parameter related to a physical resource.

The term "user terminal" is intended to cover any suitable type of wireless user equipments, such as mobile telephones, portable data processing devices, portable web browsers or vehicle-mounted mobile stations.

In general, the various embodiments of the present disclosure may be implemented in hardware or special purpose circuits, software, logic or any combination thereof. For example, some aspects may be implemented in hardware, while other aspects may be implemented in firmware or software which may be executed by a controller, microprocessor or other computing devices, although the present disclosure is not limited thereto.

The embodiments of the present disclosure may be implemented by computer program instructions executed by a data processor in a mobile device, such as in a processor entity, or by hardware, or by a combination of software and hardware. The computer program instructions may be assembly instructions, instruction set architecture (ISA) instructions, machine instructions, machine-related instructions, microcode, firmware instructions, status setting data, or source codes or object codes written in any combination of one or more programming languages.

The various blocks of the logical determination diagrams in drawings of the present disclosure may represent program steps, or interconnected logic circuits, blocks and functions, or a combination of program steps and logic circuits, blocks and functions. The computer program may be stored in the memory. The memory may be any type suitable to the local technical environment and may be implemented by using any suitable data storage technologies, such as, but not limited to, a read-only memory (ROM), a random access memory (RAM), an optional memory device and system (such as a digital video disc (DVD) or compact disk (CD)). The computer-readable medium may include a non-transitory storage medium. The data processor may be any type suitable to the local technical environment, such as, but not limited to, a general purpose computer, a special purpose computer, a microprocessor, a digital signal processing (DSP), an application specific integrated circuit (ASIC), a field-programmable gate array (FPGA), and a processor based on multi-core processor architecture.

What is claimed is:

1. A time difference determination method, comprising:
    determining a time difference based on at least one of the following parameters: a parameter related to a timing parameter, a parameter related to a timing advance, or a parameter related to a physical resource;
    wherein determining the time difference comprises determining the time difference according to the following formula:

$$TDiff = T_{TA}/2 + (-N_{TA,offset}/2 + N_{B,offset} + T_D \cdot N_G) \cdot T_c,$$

wherein TDiff represents the time difference between a distributed unit (DU) transmission from a serving cell and an integrated access and backhaul node-mobile terminal (IAB-MT) reception,
    $T_{TA}$ represents the timing advance and $T_{TA}$ refers to a time advance of an IAB-MT transmission with respect to the IAB-MT reception, or, refers to a difference between an IAB-MT reception time and an IAB-MT transmission time,
    $N_{TA,offset}$ represents a timing advance offset,
    $N_{B,offset}$ represents a baseline offset,
    $T_D$ represents a timing parameter index,
    $N_G$ represents a timing parameter granularity,
    $T_c$ represents a time unit, and $T_c = 1/(\Delta f_{max} \cdot N_f)$, where $\Delta f_{max} = 480 \cdot 10^3$ HZ, and $N_f = 4096$.

2. The method of claim 1, wherein the parameter related to the timing parameter comprises at least one of:
    the timing parameter index, a timing parameter index offset, a timing parameter range, the timing parameter granularity, or the baseline offset.

3. The method of claim 1, wherein the parameter related to the timing advance comprises at least one of:
    the timing advance, a timing advance granularity, or the timing advance offset.

4. The method of claim 1, wherein the parameter related to the physical resource comprises a frequency range or a sub-carrier spacing.

5. The method of claim 1, wherein
    for a first frequency range, $N_{B,offset} = -70528$ and $N_G = 64$; and
    for a second frequency range, $N_{B,offset} = -17664$ and $N_G = 32$.

6. A device, comprising:
    at least one processor; and
    a memory, which is configured to store at least one program;
    wherein when executed by the at least one processor, the at least one program causes the at least one processor to implement:
    determining a time difference based on at least one of the following parameters: a parameter related to a timing parameter, a parameter related to a timing advance, or a parameter related to a physical resource;
    wherein when executed by the at least one processor, the at least one program causes the at least one processor to implement:
    determining the time difference according to the following formula:

$$TDiff = T_{TA}/2 + (-N_{TA,offset}/2 + N_{B,offset} + T_D \cdot N_G) \cdot T_c,$$

wherein TDiff represents the time difference between a distributed unit (DU) transmission from a serving cell and an integrated access and backhaul node-mobile terminal (IAB-MT) reception,
    $T_{TA}$ represents the timing advance and $T_{TA}$ refers to a time advance of an IAB-MT transmission with respect to the IAB-MT reception, or, refers to a difference between an IAB-MT reception time and an IAB-MT transmission time,
    $N_{TA,offset}$ represents a timing advance offset,
    $N_{B,offset}$ represents a baseline offset,
    $T_D$ represents a timing parameter index,
    $N_G$ represents a timing parameter granularity,
    $T_c$ represents a time unit, and $T_c = 1/(\Delta f_{max} \cdot N_f)$, where $\Delta f_{max} = 480 \cdot 10^3$ HZ, and $N_f = 4096$.

7. The device of claim 6, wherein the parameter related to the timing parameter comprises at least one of:
    the timing parameter index, a timing parameter index offset, a timing parameter range, the timing parameter granularity, or the baseline offset.

8. The device of claim 6, wherein the parameter related to the timing advance comprises at least one of:
    the timing advance, a timing advance granularity, or the timing advance offset.

9. The device of claim 6, wherein the parameter related to the physical resource comprises a frequency range or a sub-carrier spacing.

10. The device of claim 6, wherein
    for a first frequency range, $N_{B,offset} = -70528$ and $N_G = 64$; and
    for a second frequency range, $N_{B,offset} = -17664$ and $N_G = 32$.

11. A non-transitory computer-readable storage medium, which is configured to store a computer program which, when executed by a processor, implements:
    determining a time difference based on at least one of the following parameters: a parameter related to a timing parameter, a parameter related to a timing advance, or a parameter related to a physical resource;

wherein the computer program, when executed by a processor, implements:

determining the time difference according to the following formula:

$$TDiff = T_{TA}/2 + (-N_{TA,offset}/2 + N_{B,offset} + T_D \cdot N_G) \cdot T_c,$$

wherein TDiff represents the time difference between a distributed unit (DU) transmission from a serving cell and an integrated access and backhaul node-mobile terminal (IAB-MT) reception, $T_{TA}$ represents the timing advance and $T_{TA}$ refers to a time advance of an IAB-MT transmission with respect to the IAB-MT reception, or, refers to a difference between an IAB-MT reception time and an IAB-MT transmission time, $N_{TA,offset}$ represents a timing advance offset, $N_{B,offset}$ represents a baseline offset, $T_D$ represents a timing parameter index, $N_G$ represents a timing parameter granularity, $T_c$ represents a time unit, and $T_c = 1/(\Delta f_{max} \cdot N_f)$, where $\Delta f_{max} = 480 \cdot 10^3$ HZ, and $N_f = 4096$.

12. The storage medium of claim 11, wherein the parameter related to the timing parameter comprises at least one of:
the timing parameter index, a timing parameter index offset, a timing parameter range, the timing parameter granularity, or the baseline offset.

13. The storage medium of claim 11, wherein the parameter related to the timing advance comprises at least one of:
the timing advance, a timing advance granularity, or the timing advance offset.

14. The storage medium of claim 11, wherein the parameter related to the physical resource comprises a frequency range or a sub-carrier spacing.

15. The storage medium of claim 11, wherein
for a first frequency range, $N_{B,offset} = -70528$ and $N_G = 64$; and
for a second frequency range, $N_{B,offset} = -17664$ and $N_G = 32$.

* * * * *